(12) United States Patent
Zong et al.

(10) Patent No.: US 10,751,962 B2
(45) Date of Patent: Aug. 25, 2020

(54) MODULAR PRODUCTION LINE FOR THE PRODUCTION OF OPHTHALMIC LENSES

(71) Applicant: Novartis AG, Basel (CH)

(72) Inventors: Shu Zong, Cumming, GA (US); Peter Hagmann, Waldburg (DE); Roger Biel, Aschaffenburg (DE); Axel Heinrich, Aschaffenburg (DE); Stephan Pirl, Dietzenbach (DE)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 16/109,136

(22) Filed: Aug. 22, 2018

(65) Prior Publication Data
US 2019/0061294 A1 Feb. 28, 2019

Related U.S. Application Data

(60) Provisional application No. 62/549,571, filed on Aug. 24, 2017.

(51) Int. Cl.
*B29D 11/00* (2006.01)
*B29C 31/00* (2006.01)
*B29L 11/00* (2006.01)

(52) U.S. Cl.
CPC ...... *B29D 11/00182* (2013.01); *B29C 31/006* (2013.01); *B29D 11/00134* (2013.01);
(Continued)

(58) Field of Classification Search
None
See application file for complete search history.

(56) References Cited

U.S. PATENT DOCUMENTS 5,690,866 A 11/1997 Andersen et al.
5,829,222 A 11/1998 Schlagel et al.
(Continued)

FOREIGN PATENT DOCUMENTS

EP 0183324 A2 6/1986
EP 0969956 B1 11/2004

OTHER PUBLICATIONS

Aase et al., "U-shaped assembly line layouts and their impact on labor productivity: An experimental study", European Journal of Operational Research 156 (2004) pp. 698-711. (Year: 2004).*

*Primary Examiner* — Lisa L Herring
(74) *Attorney, Agent, or Firm* — Sheng-Hsin Hu

(57) ABSTRACT

A modular production line for the production of contact lenses comprises at least three separate modules:
a manufacturing module (MM),
an inspection module (IM), and
a packaging module (PP).
The modular production line further comprises fixedly arranged transfer interfaces between the individual modules (MM, IM, PP) for transferring the lenses from a preceding module to a subsequent module. The manufacturing module (MM) comprises a plurality of manufacturing stations (300, 301, 302, 310, 320, 321, 322, 330, 331, 340, 341, 342, 350, 351, 352) which are grouped to form a plurality of individual manufacturing units (30; 31; 32; 33; 34; 35) arranged in a closed loop. Reusable male and female molds (212, 112) are transported through the manufacturing stations of the manufacturing units, and each manufacturing unit (30; 31; 32; 33; 34; 35) comprises a plurality of the manufacturing stations (300, 301, 302, 310, 320, 321, 322, 330, 331, 340, 341, 342, 350, 351, 352). A plurality of transfer robots (36) is provided, each transfer robot (36) of the plurality of transfer robots (36) being arranged at a location between two manu- (Continued)

facturing units (30; 31; 32; 33; 34; 35) to transfer the reusable molds from one manufacturing unit to the other manufacturing unit.

12 Claims, 10 Drawing Sheets

(52) U.S. Cl.
CPC .... *B29D 11/00259* (2013.01); *B29D 11/0025* (2013.01); *B29D 11/00125* (2013.01); *B29L 2011/0041* (2013.01)

(56) References Cited

U.S. PATENT DOCUMENTS

| | | | |
|---|---|---|---|
| 5,842,325 A * | 12/1998 | Godly | B65B 25/008 53/411 |
| 6,012,471 A | 1/2000 | Calvin et al. | |
| 6,082,987 A | 7/2000 | Su et al. | |
| 6,113,817 A * | 9/2000 | Herbrechtsmeier | B29D 11/0023 264/1.1 |
| 6,246,062 B1 | 6/2001 | Ross, III et al. | |
| 6,609,041 B1 * | 8/2003 | Sanka | B29D 11/00125 700/115 |
| 2003/0108637 A1 * | 6/2003 | O'Dunlaing | B29C 31/006 425/453 |
| 2007/0035052 A1 * | 2/2007 | Goodenough | B29D 11/0024 264/1.32 |
| 2007/0267765 A1 | 11/2007 | Ansell et al. | |
| 2009/0145462 A1 | 6/2009 | Beebe et al. | |
| 2009/0219517 A1 | 9/2009 | Lassig et al. | |
| 2010/0258962 A1 * | 10/2010 | Doerr | B29D 11/00019 264/2.2 |
| 2011/0089585 A1 * | 4/2011 | Biel | B29D 11/00259 264/1.1 |
| 2014/0091016 A1 * | 4/2014 | Biel | G01B 11/0675 209/586 |
| 2014/0092395 A1 * | 4/2014 | Fechner | G01M 11/0207 356/517 |
| 2015/0209819 A1 | 7/2015 | Biel et al. | |
| 2016/0223429 A1 * | 8/2016 | Fecnher | G01B 11/24 |

* cited by examiner

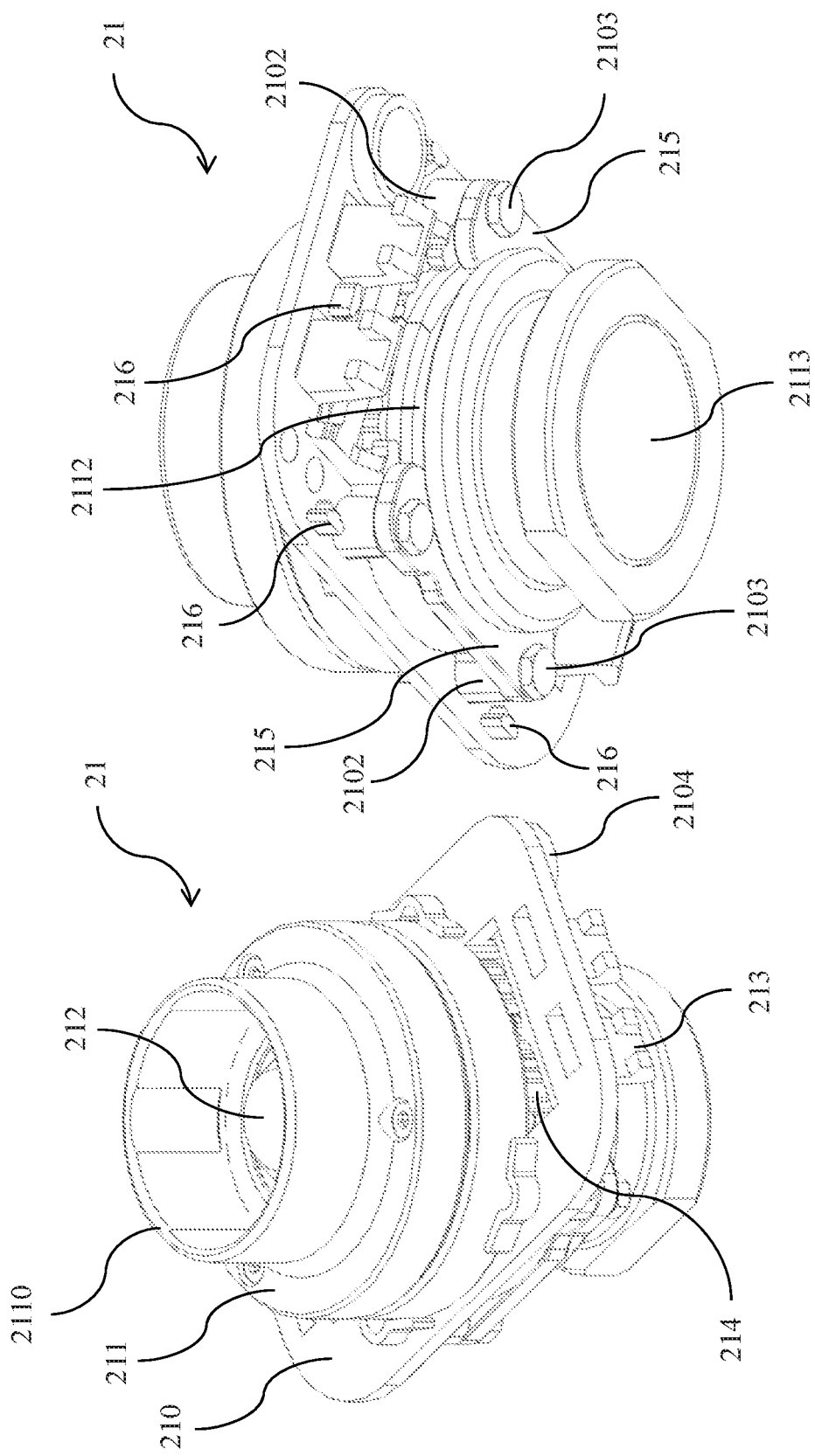

MODULAR PRODUCTION LINE FOR THE PRODUCTION OF OPHTHALMIC LENSES

This application claims the benefit under 35 USC § 119 (e) of U.S. provisional application No. 62/549,571 filed 24 Aug. 2017, incorporated by reference in its entirety.

The invention relates to a modular production line for the manufacture of ophthalmic lenses, in particular contact lenses such as soft contact lenses.

The manufacture of ophthalmic lenses, in particular contact lenses such as soft contact lenses, is typically carried out in fully automated manufacturing lines where the contact lenses are produced in high numbers. In particular, contact lenses which are worn only once and which are disposed of after being worn need to be produced in very high numbers. Such contact lenses are produced, for example, in a closed-loop process with the aid of reusable lens molds made of glass which are used many times to produce the high number of contact lenses.

As regards the manufacture of the contact lenses, each mold typically comprises male and female mold halves which, upon being mated and closed, together form a mold cavity between them defining the geometry of the contact lens to be formed. Initially, a lens forming material is dispensed into one of the mold halves, for example into the female mold half, prior to the mold halves being mated. For the sake of simplicity, in the following it will only be referred to male molds and female molds rather than to male mold halves and female mold halves. After dispensing of the lens forming material into the female mold, the male and female molds are mated and closed, and the lens forming material enclosed in the mold cavity is polymerized and/or crosslinked to form the contact lens. Thereafter, the mold is opened again by separating the male and female molds, the contact lens is removed from either the male mold or the female mold, and the contact lens is then advanced for being further processed.

For example, in case the contact lens is a silicone hydrogel contact lens, solvents contained in the lens forming material which are also contained in the contact lens formed therefrom as well as any non-polymerized and/or non-crosslinked lens forming material need to be extracted from the contact lens. Also, a coating can be applied to the contact lens in order to improve lubricity of the contact lens so as to improve the comfort when the lens is worn on the eye. For these purposes, the contact lenses may be transported through different baths (extraction baths, water baths, coating baths) before the extracted and coated contact lens is further advanced for getting inspected.

Inspection of the contact lens is then performed and may comprise an inspection for defects of the contact lens such as bubbles, inclusions, edge defects, other cosmetic defects, etc., but may in addition also comprise measurement of the optical characteristics and the central thickness of the contact lens.

Once the contact lens has successfully passed inspection it is advanced to the primary packaging station where it is placed into a packaging shell. Packaging liquid is then dispensed into the packaging shell, and a foil is placed onto the shell and is heat-sealed thereto.

As regards the molds used in the manufacture of the contact lens, once the contact lens has been removed the male and female molds are cleaned, rinsed and dried and are then re-used to manufacture the next contact lens in the manner described above.

In the manufacture of contact lenses, a number of lots of contact lenses are produced on the production line at the same time with the aid of a plurality of lens mold carriers (male lens mold carriers and female lens mold carriers) which are transported through the manufacturing stations of the production line. The production line is configured and specifically adapted to perform one specific well-defined process, in which each station is specifically adapted to perform a specific function in that well-defined process.

In case contact lenses are to be produced having optical properties and/or lens geometries different from those presently produced on the production line, production is interrupted and a line clearance is performed, that is to say all lens mold carriers presently on the production line are removed from the production line. Thereafter, new lens mold carriers which have been configured off-line with molds suitable to produce the desired optical properties and/or lens geometries are placed on the production line so that after resuming production again contact lenses having the desired optical properties and/or lens geometries are produced. However, before resuming production, a number of sample contact lenses must be produced, and only after these sample contact lenses have been produced and inspected and have been found to have the required specifications, production can be resumed. This is a laborious and time-consuming process with very considerable downtime of the production line during which no contact lenses can be produced. In addition, since the production line is configured and specifically adapted to perform one specific well-defined process, the process performed by the production line always remains exactly the same and cannot be changed. That is to say the lens forming material and also the process parameters remain completely unchanged, only the new molds actually on the production line are different from the molds that have been used on the production line before.

While production lines of this type are highly efficient in the production of high numbers of contact lenses made from the same lens forming material using always the same process with the same stations and process parameters, the production line is inflexible with respect to changes to the overall process, with respect to changes of process stations or parameters, with respect to changes of the lens forming material, or with respect to combinations of such changes.

It is therefore an object of the invention to suggest a production line which overcomes the afore-mentioned disadvantages and allows for more flexibility regarding the production process.

The present invention suggests a modular production line for the production of ophthalmic lenses, in particular contact lenses such as soft contact lenses, comprising at least three separate modules. The at least three separate modules comprise:

a manufacturing module in which the lenses are manufactured,
an inspection module in which the lenses are inspected, and
a packaging module in which the lenses which have been identified by the inspection module as being acceptable are packed into primary packages.

The modular production line further comprises fixedly arranged transfer interfaces between the individual modules for transferring the lenses from a respective preceding module of the at least three modules to a respective subsequent module of the at least three modules.

The manufacturing module comprises a plurality of manufacturing stations. The manufacturing stations of the manufacturing module are grouped to form a plurality of individual manufacturing units arranged in a closed loop. The manufacturing module further comprises reusable male and female molds which are transported through the manufacturing stations of the individual manufacturing units arranged in the closed loop. Each individual manufacturing unit of the plurality of individual manufacturing units comprises a plurality of the manufacturing stations. The manufacturing module further comprises a plurality of transfer robots. Each transfer robot of the plurality of transfer robots is arranged at a location between two said individual manufacturing units of the plurality of individual manufacturing units and is configured to transfer the reusable molds from one of the two individual manufacturing units between which the respective transfer robot is arranged to the other one of the individual manufacturing units between which the respective transfer robot is arranged.

According to one aspect of the modular production line according to the invention, the modular production line further comprises
  an extraction and treatment module for the extraction and chemical treatment of the lenses manufactured in the manufacturing module.

The extraction and treatment module comprises a plurality of chemical treatment stations which are arranged in a U-shaped configuration from that transfer interface, where the lenses are transferred from the manufacturing module to the extraction and treatment module, to that transfer interface where the lenses are transferred from the extraction and treatment module to the inspection module.

According to a further aspect of the modular production line according to the invention, the chemical treatment stations of the extraction and treatment module comprise at least one extraction station for the extraction of unwanted substances from the lenses, and at least one additional chemical treatment station for chemical treatment of the extracted lenses. The at least one additional chemical treatment station is arranged downstream of the at least one extraction station with respect to a path of transportation of the lenses through the chemical treatment stations arranged in the U-shaped configuration in the extraction and treatment module.

According to still a further aspect of the modular production line according to the invention, the plurality of chemical treatment stations or the at least one additional chemical treatment station, respectively, comprises at least one coating station for coating the lenses.

According to yet a further aspect of the modular production line according to the invention, the extraction and treatment module further comprises one or more water treatment stations, with a said water treatment station being arranged at least between different types of the said chemical treatment stations or between different types of additional chemical treatment stations, respectively.

According to still a further aspect of the modular production line according to the invention, the extraction and treatment module comprises the at least one extraction station, the at least one coating station, and a plurality of the water treatment stations. A first water treatment station of the said plurality of water treatment stations is arranged at the interface between the manufacturing module and the extraction and treatment module. The said at least one extraction station is arranged downstream of the first water treatment station. A second water treatment station of the said plurality of water treatment stations is arranged downstream of the at least one extraction station. The at least one coating station is arranged downstream of the said second water treatment station. A third water treatment station of the said plurality of water treatment stations is arranged downstream of the said coating station.

According to another aspect of the modular production line according to the invention, in the manufacturing module
  a first individual manufacturing unit of the plurality of manufacturing units comprises a male mold exchange station, a female mold exchange station, and a toric axis setting station,
  a second individual manufacturing unit of the plurality of manufacturing units comprises a dosing station for dosing a lens forming material into male or female molds, a closing station for mating the male and female molds, and a forming station for moving the mated male and female molds to an intermediate closed position,
  a third individual manufacturing unit comprises a curing station for curing the lens forming material to form lenses, and a relative mold movement station configured to perform a relative movement of the male and female molds from the intermediate closed position to a final closed position during curing of the lens forming material,
  a fourth individual manufacturing unit comprises a mold opening station for separating the male and female molds, a rinsing station for rinsing away any excess lens forming material from the molds, and a removal station for removing the lenses from the molds and transferring them out of the manufacturing module, and
  a fifth individual manufacturing unit comprises a mold cleaning station, a mold rinsing station, and a mold drying station.

According to a further aspect of the modular production line according to the invention, the manufacturing module is configured to assign to each lens a unique lens identification code which is representative of the type of lens at least for a predetermined period of time.

According to still a further aspect of the modular production line according to the invention, the manufacturing module further comprises a printing station. The printing station is configured to print the unique lens identification code to one of the reusable male and female molds.

According to yet a further aspect of the modular production line according to the invention, the printing station is an inkjet printing station.

According to another aspect of the modular production line according to the invention, the inspection module comprises an inversion detection station for inspecting the lenses as to whether the lenses are inverted, a reinversion station for reinverting the lenses in case they have been detected as being inverted, a cosmetic inspection station for inspecting the lenses for cosmetic defects, a diopter measurement station for measuring the optical properties of the lens, and a center thickness measurement station for measuring the center thickness of the lens.

According to another aspect of the modular production line according to the invention, the packaging module comprises a shell providing station for providing a packaging shell, a lens placement station for placing a lens into the packaging shell, a liquid dosing station for dosing a packaging liquid into the packaging shell, a foil placement station for placing a foil onto the packaging shell, a sealing station for sealing the foil to the packaging shell, and a printing station for printing on the foil information about the lens contained in the sealed packaging shell.

And according to yet another aspect of the modular production line according to the invention, the packaging module further comprises a lens detection station arranged downstream of the lens placement station, as well as a configuration station for intermediately storing a plurality of lenses and for placing a lens intermediately stored in the configuration station into a said shell in case it has been detected in the lens detection station that no lens has been placed into the shell in the lens placement station.

The modular construction of the production line according to the invention allows to change a lens manufacturing process in a comparatively easy manner, as only the individual manufacturing units must be exchanged or replaced, while the transfer robots may remain installed. If one or more additional manufacturing unit needs to be added, it is only necessary to install such additional manufacturing unit or units and to install a corresponding number of additional transfer robots, but this is essentially all that needs to be done. Each manufacturing unit that comprises a plurality of manufacturing stations may conveniently be set up outside the manufacturing unit and can be installed in the manufacturing module after being properly set up. By way of example, it is thus possible to completely change a lens manufacturing process, including the lens-forming material, by replacing the individual manufacturing units arranged in the manufacturing module and performing a first lens manufacturing process with new individual manufacturing units performing a second lens manufacturing process which may be completely different from the first manufacturing process, including the lens-forming material. By way of example only, a first lens manufacturing process (which is well-known in the art) for manufacturing silicone hydrogel soft contact lenses may be performed using a lens-forming material comprising solvents which need to be extracted from the silicon hydrogel soft contact lens after the silicone hydrogel soft contact lens has been manufactured as well as any non-polymerized and/or non-crosslinked lens forming material contained in the silicone hydrogel soft contact lens, and in addition the extracted silicone hydrogel soft contact lens needs to be coated in order to be able to be conveniently worn on the eye, so that after the silicon hydrogel soft contact lens has been manufactured in the manufacturing module the silicone hydrogel soft contact lens must be extracted and coated in an extraction and treatment module. If soft contact lenses are now to be produced on the basis of a PVA-based lens-forming material in a second manufacturing process (which itself is also well-known in the art) substantially different from the first manufacturing process no extraction or coating of the soft contact lens is required at all, so that no extraction and treatment module is needed for the soft contact lens. In addition, since the second manufacturing process is substantially different from the first manufacturing process, the manufacturing units in the manufacturing module performing the first lens manufacturing process must be replaced with manufacturing units performing the second manufacturing process and production can then be resumed (the extraction and treatment module, if present in the production line, can then be bypassed). As the individual manufacturing units needed for the second manufacturing process can be set up outside of the manufacturing module, a comparatively easy and quick change from one lens manufacturing process to another lens manufacturing process is possible, thus rendering the production line highly flexible.

In case an extraction and treatment module is present in the modular production line, such as for example in the above-described production line for producing silicon hydrogel soft contact lenses, it may also be desirable to change the extraction and chemical treatment process, for example by adding additional treatment stations. In this case, the U-shaped configuration of the extraction and treatment module allows for adding additional stations to the parallel legs of the U-shaped configuration such that the length of the legs of the "U" is increased, however, the fixedly arranged transfer interface between the manufacturing module and the extraction and treatment module as well as the fixedly arranged transfer interface between the extraction and treatment module and the inspection module are not affected by the addition of additional chemical treatment stations, they remain fixedly arranged. This allows for easy process changes in the extraction and treatment module of the production line, again rendering the production line highly flexible.

For example, in the case of the silicone hydrogel soft contact lens mentioned above the extraction and treatment module in addition to one or more extraction stations may comprise one or more additional chemical treatment stations, for example one or more coating stations. It is evident that the one or more additional chemical treatment stations must be arranged downstream of the one or more extraction stations in the U-shaped configuration of the extraction and treatment module. Further by way of example, between the different types of chemical treatment stations (in the embodiment described between the one or more extraction stations and the one or more coating stations) one or more water treatment stations are arranged to avoid that chemicals of the one or more extraction stations are carried over to the one or more coating stations. In particular, the extraction and treatment module may comprise a first water treatment station at the interface between the manufacturing module and the extraction and treatment module, so that the lenses manufactured are first treated in the said first water treatment station. Downstream of this first water treatment station the one or more extraction stations are arranged where the extractables, in particular any non-polymerized and/or non-crosslinked lens forming material as well as solvents, are removed and extracted from the lenses. Downstream of the one or more extraction stations a second water treatment station is arranged, followed by the one or more coating stations. And downstream of the said one or more coating stations a third water treatment station is arranged again, so that the last treatment station of the extraction and treatment module is a water treatment station.

According to one particular aspect of the production line according to the invention, a so-called "lot change on the fly" is possible without interruption of production. In known production lines, the lens molds are transported through the various manufacturing stations with the aid of lens mold carriers to which mold units are mounted, with each mold unit comprising a male mold or a female mold (although in general the mold can as well be directly mounted to the lens mold carrier or in a manner other than through a mold unit). A predetermined number of such lens mold carriers is present on the production line and is transported through the production line during the lens manufacturing process. On each of the lens mold carriers, the same mold units are arranged in the same sequence, so that always the same type of lenses (same geometries) is produced by the mold units which are arranged at the same location on the respective lens mold carrier. In case a lot change must be performed, production must be interrupted and a line clearance must be performed. This means, that all lens mold carriers must be removed from the production line and new lens mold carriers must be placed on the production line. These new lens mold carriers must be configured in manner so as to be able to produce the desired new lots of lenses (the set-up/configuration of the new lens mold carriers can be performed off-line before placing them on the production line). Before resuming production, a number of sample contact lenses must be produced, and only after these sample contact lenses have been produced and inspected and have been found to have the required specifications, production can be resumed. This is a laborious and time-consuming process with very considerable downtime of the production line during which no contact lenses can be produced. In addition, once the new lens mold carriers have been placed on the production line, it is again only possible to produce the new lots of lenses represented by the molds which are presently on the production line. If a lot change must be performed again, production must be interrupted and a line clearance has to be performed again as described above. Line clearance, however, results in a considerable downtime of the production line which is ineffective and therefore unwanted.

Therefore, in accordance with one particular aspect of the production line, in the manufacturing module a first manufacturing unit comprises the male mold exchange station, the female mold exchange station, and the toric axis setting station. In this first manufacturing unit it is determined whether or not a lot change is performed by either replacing a male mold or male mold unit or by replacing a female mold or female mold unit, by rotating a mold, or by a combination thereof. A second manufacturing unit comprises a dosing station for dosing a lens forming material into the male or female molds (typically into the female molds), a closing station for mating the male and female molds, and a forming station for moving the mated male and female molds to an intermediate closed position. This second manufacturing unit comprises manufacturing stations in which the molds are prepared for the subsequent forming of a lens. A third manufacturing unit comprises a curing station (in particular a UV-light station) for curing the lens forming material to form lenses and a relative mold movement station configured to perform a relative movement of the male and female molds from the intermediate closed position to a final closed position during curing of the lens-forming material. As is known, during curing the lens forming material with the aid of UV-light in a comparatively short period of time (for example, within a range of some seconds up to some twenty or some thirty seconds) the lens-forming material shrinks to a non-negligible extent. At the same time, the relative mold movement station moves the male and female molds relative to one another from the intermediate closed position (into which the male and female molds have been moved already in the forming station of the second manufacturing unit) to a final closed position in which the mold cavity formed between the male and female molds corresponds to the desired shape of the lens. As is evident, the third manufacturing unit comprises manufacturing stations in which a lens is formed from the lens forming material. A fourth manufacturing unit comprises a mold opening station for separating the male and female molds, a rinsing station for rinsing away any excess lens material, and a removal station for removing the lenses from the molds and for transporting them away from the manufacturing module. Obviously, this fourth manufacturing unit comprises manufacturing stations dealing with the opening and removal of the already formed lens from the manufacturing module. As far as the manufacturing of the lens is concerned the manufacturing of the lens is then completed, and the lens may be transported away for further treatment (e.g. chemical treatment in the extraction and treatment module, if present) or for inspection and subsequent packaging if no lens treatment is necessary. Finally, a fifth manufacturing unit comprises a mold cleaning station a mold rinsing station, and a mold drying station. In the mold cleaning station any excess material is removed from the molds while in the rinsing station a final rinse of the molds is performed before the molds are dried in the mold drying station (e.g. with the aid of drying air having a well-defined humidity). Thereafter, the reusable molds are ready again for being used in the next production cycle and may be either routinely transported to the first manufacturing unit again where a lot change on the fly may or may not be performed, or the reusable molds may be directly transported to the second manufacturing unit (i.e. skip the first manufacturing unit) or to the ink jet printing unit in case no lot change is to be performed. This inkjet printing unit is preferably arranged between the first manufacturing unit and the second manufacturing unit.

Assigning a unique lens identification code to each lens of the same type (e.g. the same optical power, the same base curve and front curve radii, etc.), for example by printing a unique lens identification code to one of the reusable male and female molds using an inkjet printer so that the code will be transferred and become part of the lens as the lens forming material is cured to form the lens, allows for checking in an inspection module (by reading the unique lens identification code) whether the lens inspected actually has the characteristics represented by the respective unique lens identification code. In addition, it allows for checking whether the lens actually inspected is that lens which is expected to be inspected at the respective time (i.e. whether the lens actually inspected is the correct lens in the sequence of lenses manufactured).

The lens identification code may be unique and is representative of the type of contact lens during a predetermined period of time. By way of example, the duration of such predetermined period of time may be from one week to three months. This means, that during this predetermined period of time the same lens identification code cannot be used for a different type of contact lens, however, after that predetermined period of time is over, the same lens identification code can be used again, even for a different type of contact lens. If the same lens identification code is used again, it is again unique and representative for this different type of contact lens for the next predetermined period of time.

Alternatively, the lens identification code may be unique and representative for the type of contact lens not only for a predetermined period of time, but may be unique and representative for this type of contact lens independent of time. This means that each unique lens identification code is representative of one type of contact lens only. Accordingly, a different type of contact lens then mandatorily must have a different unique lens identification code.

As regards the inspection module in which the lenses can be inspected, in the inversion detection station the lens is inspected as to whether or not it is inverted. Various methods can be used to detect whether or not the lens is inverted (for example, this can be performed by inspecting the inkjet code of a lens, or it may be performed by measuring the lens diameter which is different for an inverted lens, etc.) In case the lens is detected as being inverted it is then reinverted to its correct inversion state (so that it is not inverted). Thereafter, the lens may be inspected in a cosmetic inspection station for cosmetic defects such as inclusions, bubbles, tears, edge defects, etc. Also, in a diopter measurement station the optical properties of the lens may be determined (corrective power, etc.), while in a center thickness measurement station the center thickness of the lens may be determined.

Still further, the modular production line may include a packaging module for automatically packaging those lenses that have been identified by the inspection module as being acceptable, so that the entire production of the lenses—from the manufacture of the lenses to the (primary) packaging of the lenses—can be performed completely automatically. Such packaging station may comprise a shell providing station for providing a packaging shell, a lens placement station for placing a lens into the packaging shell, a foil placement station for placing a foil onto the packaging shell, a sealing station for sealing the foil to the packaging shell, and a printing station for printing on the foil information about the lens contained in the sealed packaging shell.

The packaging station may, in addition, comprise a lens detection station arranged downstream of the lens placement station for performing a lens presence check, as well as a configuration station where a plurality of lenses (of different type) are intermediately stored for a predetermined time (for example up to one hour). In case the result of the lens presence check performed in the lens detection station is that there is no lens present in the packaging shell, a lens of the type missing can be taken from the configuration station and can be placed into the shell in the lens placement station. Alternatively, the lens can be stored in the configuration station in the packaging shell, and in this case the shell with the lens missing can be replaced with a shell containing the lens of the respective type from the configuration station.

Further advantageous aspects will become apparent from the following description of embodiments of the invention with the aid of the drawings in which:

FIG. 8 shows a perspective view from above of the mold unit shown in FIG. 7;

FIG. 9 shows a perspective view from below of the mold unit shown in FIG. 7;

Figure 1:
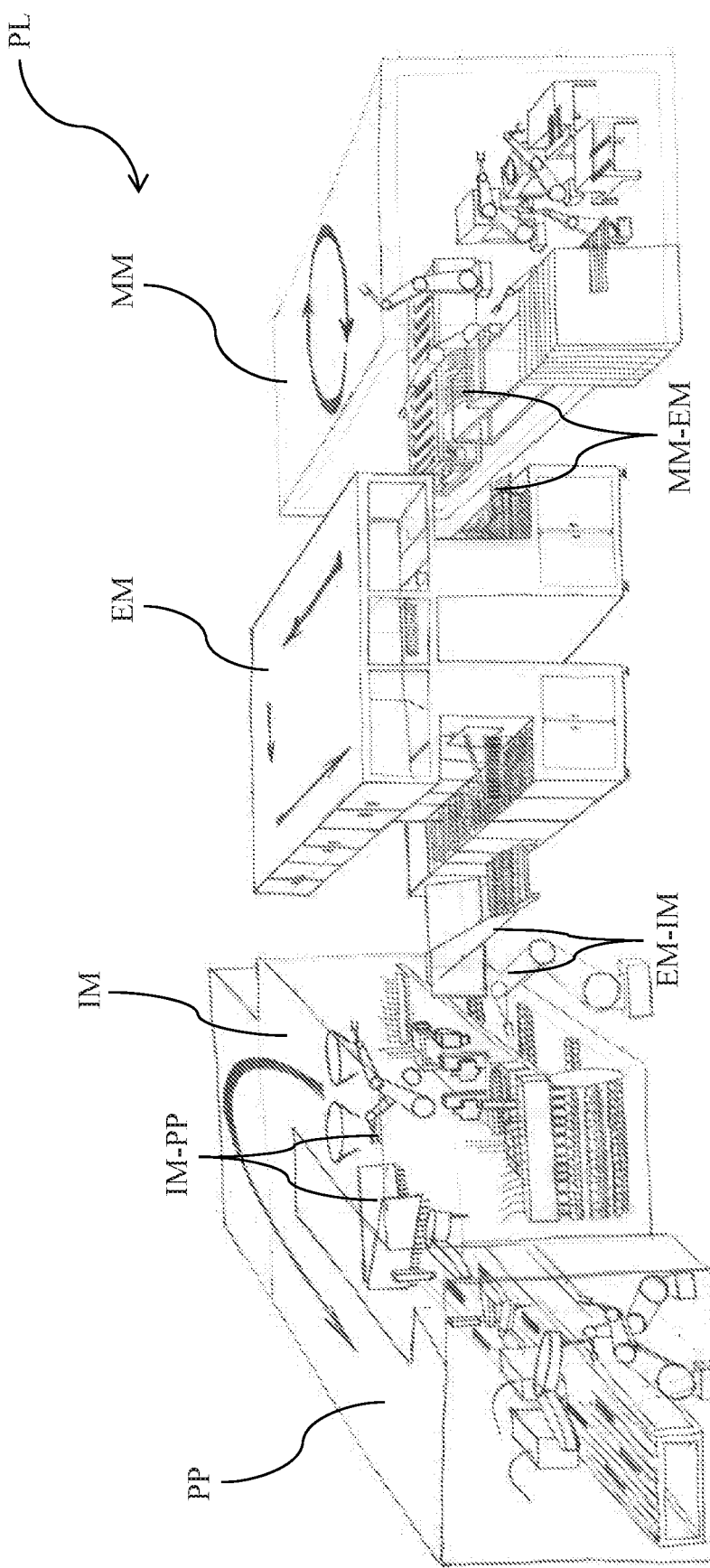
FIG. 1 shows an embodiment of a modular production line according to the invention, comprising a manufacturing module, an extraction and treatment module, an inspection module, and a packaging module.

In FIG. 1 an embodiment of a modular production line PL according to the invention for the production of contact lenses, for example soft contact lenses made of a silicone hydrogel material, is shown. Modular production line PL comprises a manufacturing module MM, an extraction and treatment module EM (in the following referred to as "extraction module" only for the sake of simplicity), an inspection module IM, and a packaging module PP for the primary packaging of the contact lenses. The interfaces MM-EM, EM-IM, IM-PP between the individual modules MM, EM, IM and PP of modular production line PL, i.e. the locations where the contact lenses (or any containers, grippers, etc. for the transportation of the contact lenses) are transferred from a preceding module to a subsequent module, are arranged at fixed locations so that in case changes are performed within one or more of the individual modules MM, EM, IM and PP this does not affect the general architecture of the modular production line. In such case, the change is performed in the respective individual module while the general architecture of the modular production line PL including the locations of the interfaces MM-EM, EM-IM, IM-PP remains unchanged.

In the manufacturing module MM, the manufacture of the contact lenses is performed. The manufactured contact lenses are subsequently transferred from the manufacturing module MM to the extraction module EM where unwanted substances, for example non-polymerized and/or non-cross-linked lens forming material or solvents, are removed and extracted from the contact lenses, and where the contact lenses may be further chemically treated. For example, a coating may be applied to the extracted contact lenses in order to increase their lubricity. The extracted and chemically treated (and coated, if applicable) contact lenses are subsequently transferred from the extraction module EM to the inspection module IM, where the contact lens is inspected as to whether it is acceptable for being packaged and distributed to customers. Once the contact lenses have been determined by the inspection module IM as being acceptable, they are transferred from the inspection module IM to the (primary) packaging module PP. Contact lenses which are determined by the inspection module IM as not being acceptable are disposed of. The acceptable contact lenses transferred to the (primary) packaging module PP are packaged in primary packages. The primary packages containing the contact lenses leaving the packaging module PP are then placed in an autoclave, and once autoclaved they are forwarded for secondary packaging.

As is already indicated in FIG. 1 schematically by the arrows and as is discussed in more detail further below, the manufacturing module MM comprises a plurality of manufacturing stations which are arranged in a closed loop, and one of these manufacturing stations is part of the interface MM-EM between the manufacturing module MM and the extraction module EM where the manufactured contact lenses are transferred from the manufacturing module MM to the extraction module EM.

Figure 6:
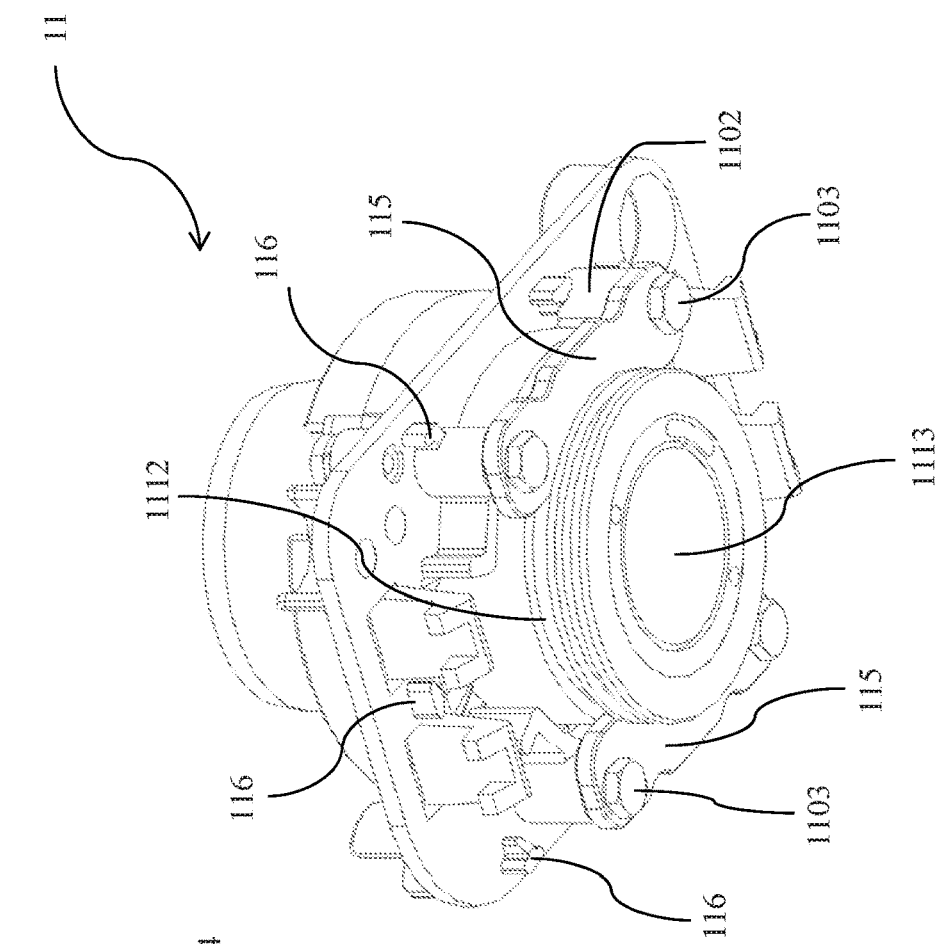
FIG. 6 shows a perspective view from below of the mold unit shown in FIG. 4.

By way of example, in the embodiments described the molds are arranged in mold units as will become apparent from the description below (although in general the molds can be either directly mounted to the lens mold carrier or in a manner other than through the mold units). In the manufacturing module MM, a plurality of lens mold carriers are transported through the individual manufacturing stations. The lens mold carriers may be embodied in the manner shown in WO 2015/078798. One embodiment of such a lens mold carrier 1 (comprising female mold units) is described in the following with the aid of FIG. 4, FIG. 5 and FIG. 6. Lens mold carrier 1 comprises a frame 10 which extends in a plane and comprises a plurality of individual compartments 100. Each of the compartments 100 is bounded by compartment walls 101, 102, 103, 104. In addition, in each compartment 100 there is an angled wall portion 105 arranged in one of the corners of the respective compartment 100.

Figure 4:
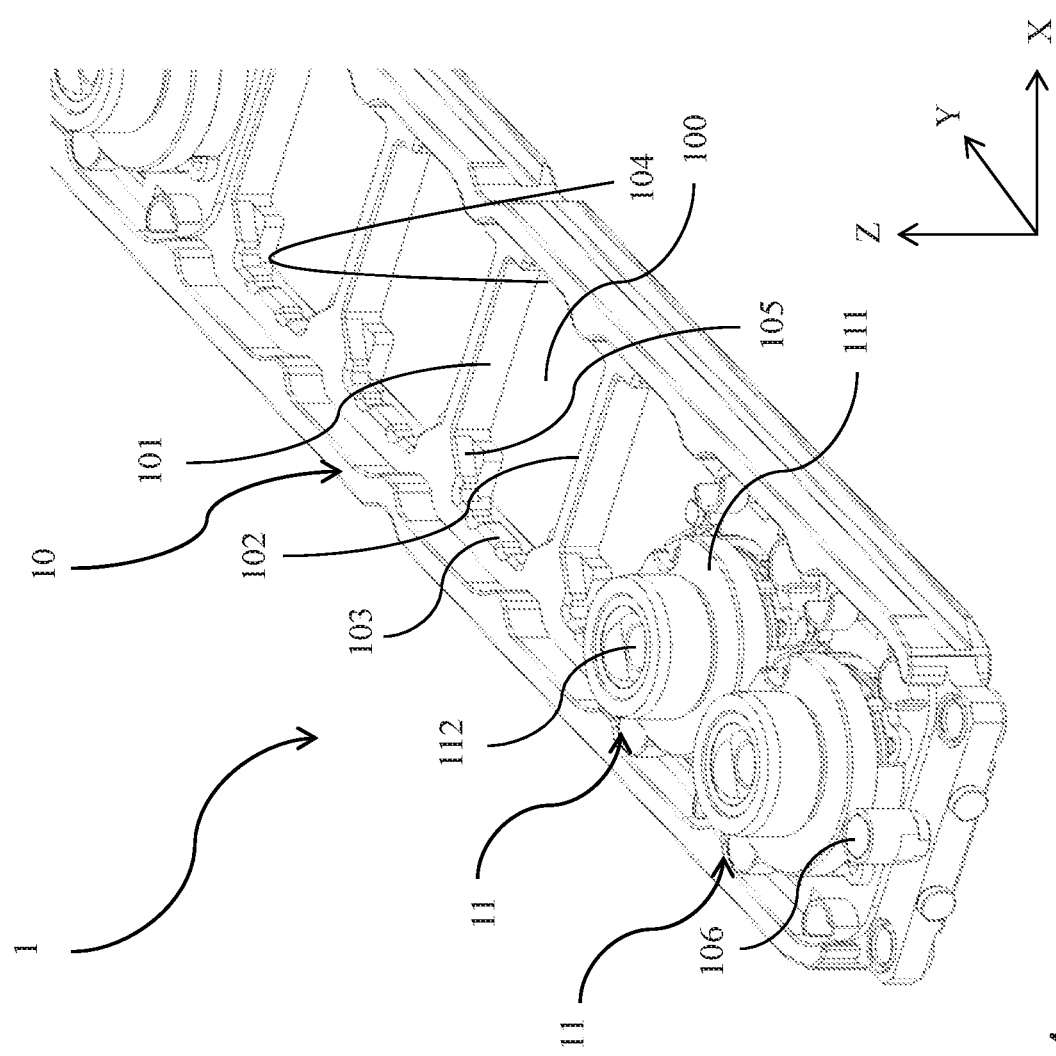
FIG. 4 shows a perspective view of a lens mold carrier including two mold units comprising female molds which are arranged at their mounting positions in compartments of a frame of the lens mold carrier.

As is shown in FIG. 4, in each of the two foremost compartments 100 of frame 10 a female mold unit 11 is arranged. Female mold unit 11 comprises an adapter piece 110 (see FIG. 5) preferably made of a thermoplastic material, and a sleeve 111. A female lens mold 112 is fixedly arranged in sleeve 111 which is fixedly arranged in adapter piece 110.

Sleeve 111 has a generally cylindrical shape. At its front end sleeve 111 extends over female lens mold 112, and this front end of sleeve 111 comprises a chamfered portion 1110 for engaging with a corresponding rounded front portion of the sleeve of a male mold unit (see further below) in order to facilitate mating of the male and female mold units. Sleeve 111 further comprises a recess 1111 into which a fixation bracket 114 engages. Fixation bracket 114 is fixedly mounted to a post 1100 projecting from the front face of adapter piece 110 with the aid of a screw 1101 and secures sleeve 111 against rotation.

Sleeve 111 comprises two or more circumferentially running grooves 1112. Two fixation brackets 115 (see FIG. 6) engage into one of the circumferentially running grooves 1112 at opposite sides. At its back end, sleeve 111 is provided with a centrally arranged glass disk 1113, as this is well-known in the art.

Adapter piece 110 further comprises a mold identifier 1104 comprising a transponder which is arranged in a stub projecting from the front face of adapter piece 110. The transponder comprises an RFID which can be read automatically and which contains information allowing to identify the female mold 112 of the respective female mold unit 11. Adapter piece 110 further comprises three stubs 1105 projecting from the front face of adapter piece 110. These stubs 1105 have the same height as the stub of mold identifier 1104.

Figure 5:
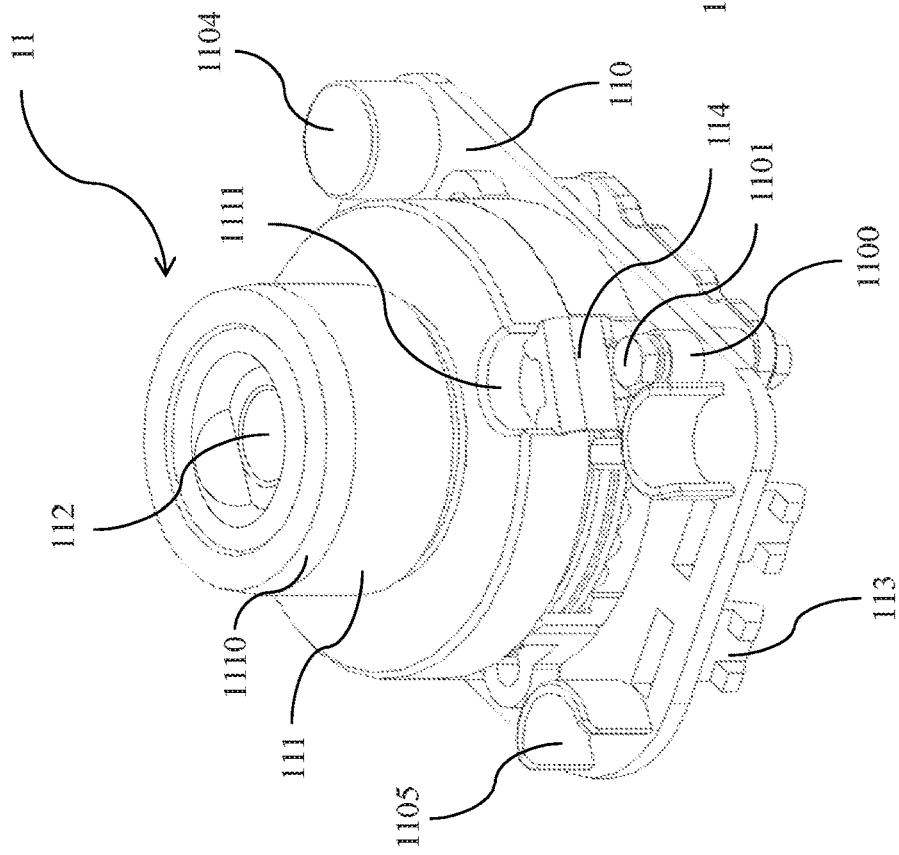
FIG. 5 shows a perspective view from above of the mold unit shown in FIG. 4.

Adapter piece 110 further comprises two pairs of resilient latches 113 (see FIG. 5). In order to securely mount female mold unit 11 to one of the compartments 100 of frame 10, female mold unit 11 is pressed from above into compartment 100 until the resilient latches 113 of adapter piece 110 snap beneath and engage the compartment walls 103, 104 of frame 10. Once this engagement has occurred, female mold unit 11 is floatingly arranged in the respective compartment 100 of frame 10. Since female mold unit 11 is floatingly arranged in compartment 100, limited movement of the adapter piece 110 is possible within compartment 100 both in a translation plane (a plane parallel to or coincident with the plane of the lens mold carrier, i.e. in x,y-direction) as well as in a direction perpendicular thereto (z-direction). On the other hand, female mold unit is securely connected to frame 10 allowing for handling and transfer of the female mold unit 11 (including female mold 112) in the manufacturing module.

As is evident, the movement of adapter piece 110 (and thus of female mold unit 11) within compartment 100 in z-direction is limited by the resilient latches 113. Movement of the adapter piece 110 in the translation plane is limited by six abutment posts 1106 arranged on the rear face of adapter piece 110 and projecting therefrom, with one of the abutment posts 116 being arranged in a specific manner to allow for mounting of adapter piece 110 to the frame 10 in the respective compartment 100 only in one orientation (the correct orientation). The limited movement of adapter piece 110 within compartment 100 in the translation plane may amount up to 0.3 mm in the x-direction and up to 0.3 mm in the y-direction (in each of the positive and negative x- or y-direction, respectively; i.e. ±0.3 mm).

As can be seen from FIG. 4, frame 10 is provided with a carrier identifier 106 comprising a transponder which is arranged in a stub projecting from the front face of frame 10. The transponder comprises an RFID which can be read automatically and which contains information allowing to identify the respective lens mold carrier 1 as well as information allowing to identify which female mold 112 is arranged in which compartment 100 of the frame 10 of lens mold carrier 1. With the aid of the carrier identifier 106 and the mold identifier 1104 it is always possible to identify at any time at any desired location in the manufacturing line which mold is arranged in which compartment of which lens mold carrier. This allows for an association of the lens mold to the respective contact lenses produced with that lens mold which may be advantageous, for example, for quality monitoring and tracking purposes.

For further details of lens mold carrier 1 it is referred to the description of the afore-mentioned WO 2015/078798.

A further embodiment of such lens mold carrier, also described in detail in WO 2015/078798 is described in the following with the aid of FIG. 7, FIG. 8, FIG. 9 and FIG. 10 (an embodiment comprising male mold units). Many details of this further embodiment of the lens mold carrier 2 and of its components are similar to those of the first embodiment of the lens mold carrier 1, so that not each and every detail is explained again. As a general rule, the leading numeral "1" of the reference signs used for the embodiment of the lens mold carrier described above is replaced with the leading numeral "2" in the further embodiment of the lens mold carrier described below.

Accordingly, lens mold carrier 2 comprises a frame 20 which extends in a plane and comprises a plurality of individual compartments 200. Each of the compartments 200 is bounded by compartment walls 201, 202, 203, 204. In addition, in each compartment 200 there is an angled wall portion 205 arranged in one of the corners of the respective compartment 200.

Figure 7:
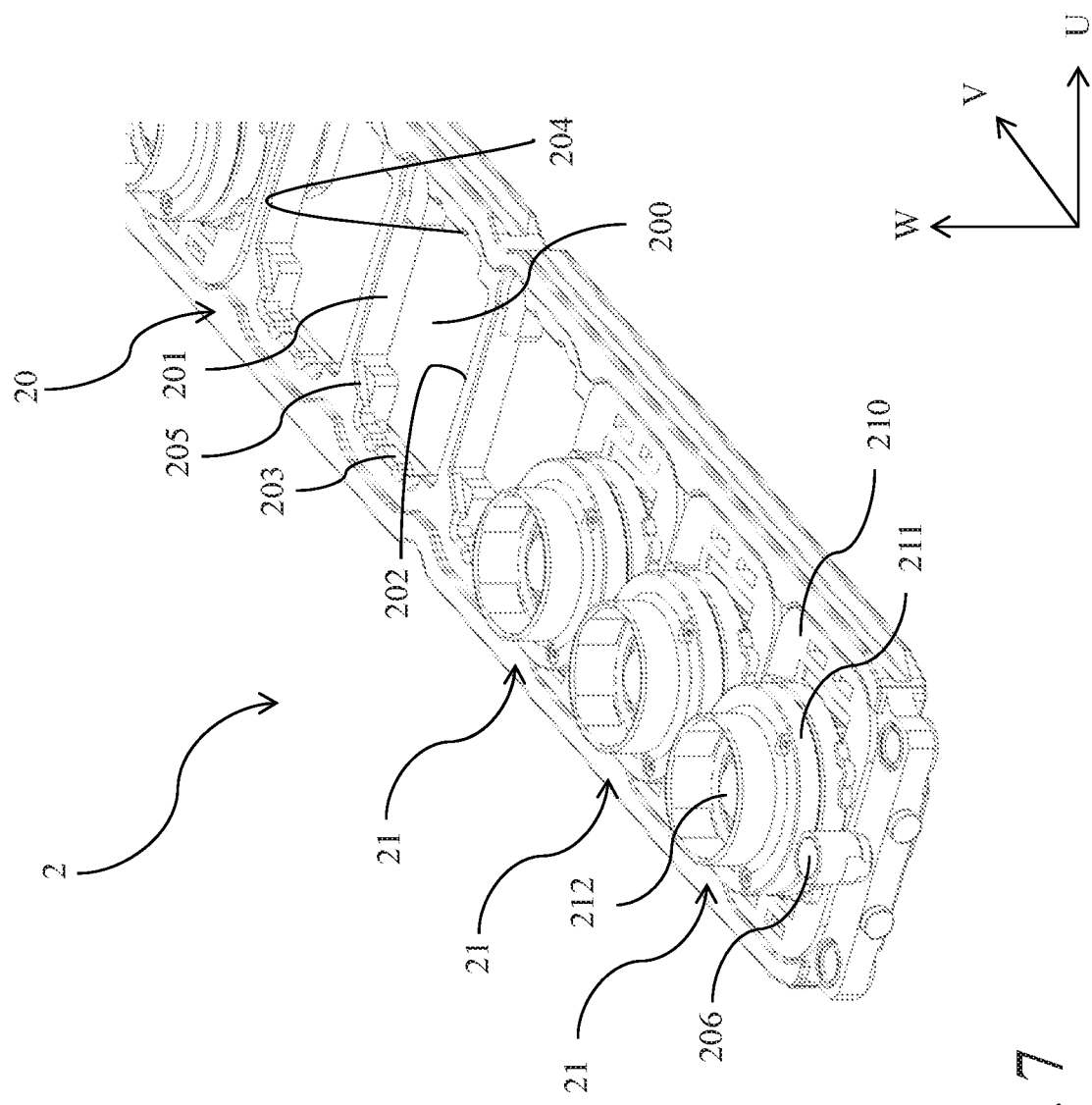
FIG. 7 shows a perspective view of a lens mold carrier including three mold units comprising male molds which are arranged at their mounting positions in compartments of a frame of the lens mold carrier.
Figure 10:
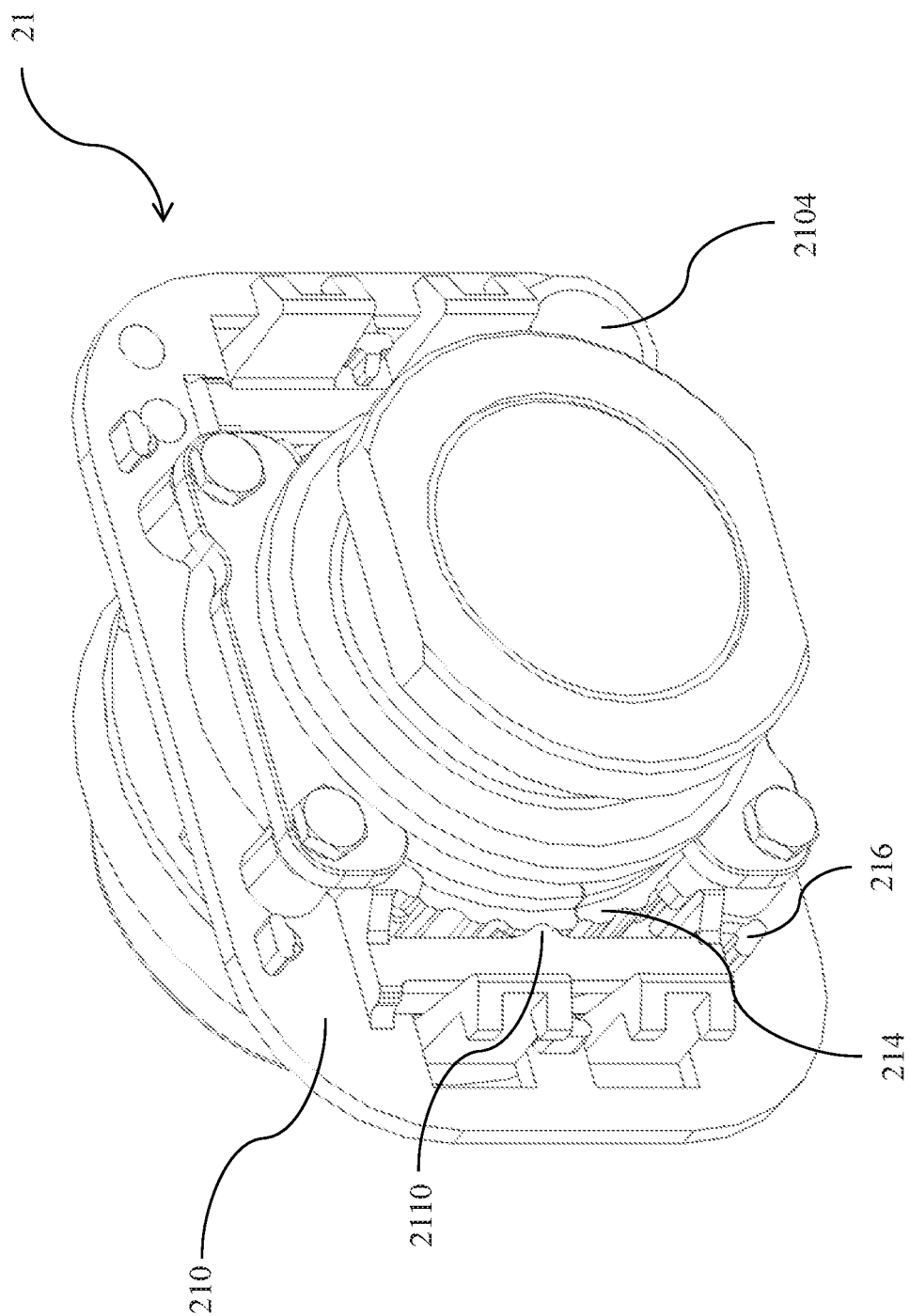
FIG. 10 shows the mold unit of FIG. 9 and the adjusting ring lockingly connected to the adapter piece of the mold unit.

As is shown in FIG. 7, in each of the three foremost compartments 200 of frame 20 a male mold unit 21 is arranged. Male mold unit 21 comprises an adapter piece 210, preferably made of a thermoplastic material, and a sleeve 211. A male lens mold 212 is fixedly arranged in sleeve 211. Sleeve 211 is arranged in a central opening of adapter piece 210 and is lockingly connected to the adapter piece 210 at a fixed angular position, but can be rotated relative to adapter piece 210 to get lockingly connected to the adapter piece 210 at another fixed angular position, as will be explained in more detail below.

Sleeve 211 has a generally cylindrical shape (see FIG. 8). At its front end sleeve 211 extends over male lens mold 212, and this front end of sleeve 211 of male mold unit 21 comprises a rounded portion 2110 for engaging with the chamfered portion 1110 of sleeve 111 of the female mold unit 11 (see FIG. 5) in order to facilitate mating of the male and female mold units. Sleeve 211 comprises two circumferentially running grooves 2112. A toothed adjusting ring 214 (see FIG. 8, FIG. 10) comprising two assembled ring pieces is arranged in one of these grooves 2112 (see FIG. 9) as well as two fixation brackets 215 which engage into the same groove 2112 at opposite sides. Adjusting ring 214 is firmly attached to sleeve 211 so that it can be rotated only together with sleeve 211 relative to adapter piece 210 in a plane parallel to the plane of the lens mold carrier 2 (u-v plane). However, rotation of adjusting ring 214 is only possible between fixed angular positions, at which the toothed adjusting ring 214 lockingly engages with two fixedly arranged locking teeth 2110 which are provided on locking elements that form part of the adapter piece 210 (see FIG. 10), these two locking teeth 2110 being arranged at opposite sides. Thus, adjusting ring 214 is lockingly connected to the adapter piece 210 at fixed angular positions. This is advantageous in the production of toric contact lenses since it allows, with the aid of a handling system, to automatically change the angular position of the axes of (toric) male mold 212 by rotating adjusting ring 214 (and together with it male mold unit 21 including male mold 212) by one or more fixed angular increments relative to adapter piece 210, and to then have it lockingly connected with adapter piece 210 again at a different angular position, so that a toric contact lens with a different arrangement of the axes can be produced. At its back end, sleeve 211 is provided with a centrally arranged glass disk 2113 allowing UV-light to pass through to the mold for curing the lens forming material, as this is well-known in the art.

Adapter piece 210 further comprises a mold identifier 2104 comprising a transponder which is arranged in a stub projecting from the rear face of adapter piece 210. The transponder comprises an RFID which can be read automatically and which contains information allowing to identify the male mold 212 of the respective male mold unit 21.

Adapter piece 210 further comprises two pairs of resilient latches 213. In order to securely mount male mold unit 21 to the frame 20 in one of the compartments 200, male mold unit 21 is pressed from above into compartment 200 until the resilient latches 213 of adapter piece 210 snap beneath and engage the compartment walls 203, 204 of frame 20. Once this engagement has occurred, male mold unit 21 is floatingly arranged in the respective compartment 200. Since male mold unit 21 is floatingly arranged in compartment 200, limited movement of the adapter piece 210 is still possible within compartment 200 both in a translation plane (which is a plane parallel to or coincident with the u-v plane) as well as in a direction perpendicular thereto (w-direction). On the other hand, male mold unit 21 is securely connected to frame 20 allowing for handling and transfer of the male mold unit 21 (including male mold 212) in the manufacturing module.

As is evident, the movement of adapter piece 210 (and thus of male mold unit 21) within compartment 200 in w-direction is limited by the resilient latches 213. Movement of the adapter piece 210 in the translation plane is limited by six abutment posts 216 arranged on the rear face of adapter piece 210 and projecting therefrom, with one of the abutment posts 216—that one in the lower left corner in FIG. 10—being arranged in a specific manner to allow for mounting of adapter piece 210 to the frame 20 in the respective compartment 200 only in one orientation (the correct orientation). The limited movement of adapter piece 210 within compartment 200 in the translation plane may amount up to 0.3 mm in the u-direction and up to 0.3 mm in the v-direction (in each of the positive and negative u- or v-direction, respectively; i.e. ±0.3 mm).

As can be seen from FIG. 7, frame 20 is provided with a carrier identifier 206 comprising a transponder which is arranged in a stub projecting from the front face of frame 20. The transponder comprises an RFID which can be read automatically and which contains information allowing to identify the respective lens mold carrier 2 as well as information allowing to identify which male mold 212 is arranged in which compartment 200 of the frame 20 of lens mold carrier 2. With the aid of the carrier identifier 206 and the mold identifier 2104 it is always possible to identify at any time at any desired location in the manufacturing line which mold is arranged in which compartment of which lens mold carrier. This allows for an association of the lens mold to the respective contact lenses produced with that lens mold which may be advantageous, for example, for quality monitoring and tracking purposes.

For further details of lens mold carrier 2 it is referred to the description of the afore-mentioned WO 2015/078798. The embodiment of lens mold carrier 1 and the embodiment of lens mold carrier 2 described above can be used in the production line PL according to the invention, an embodiment of which is already described with respect to FIG. 1.

Figure 2:
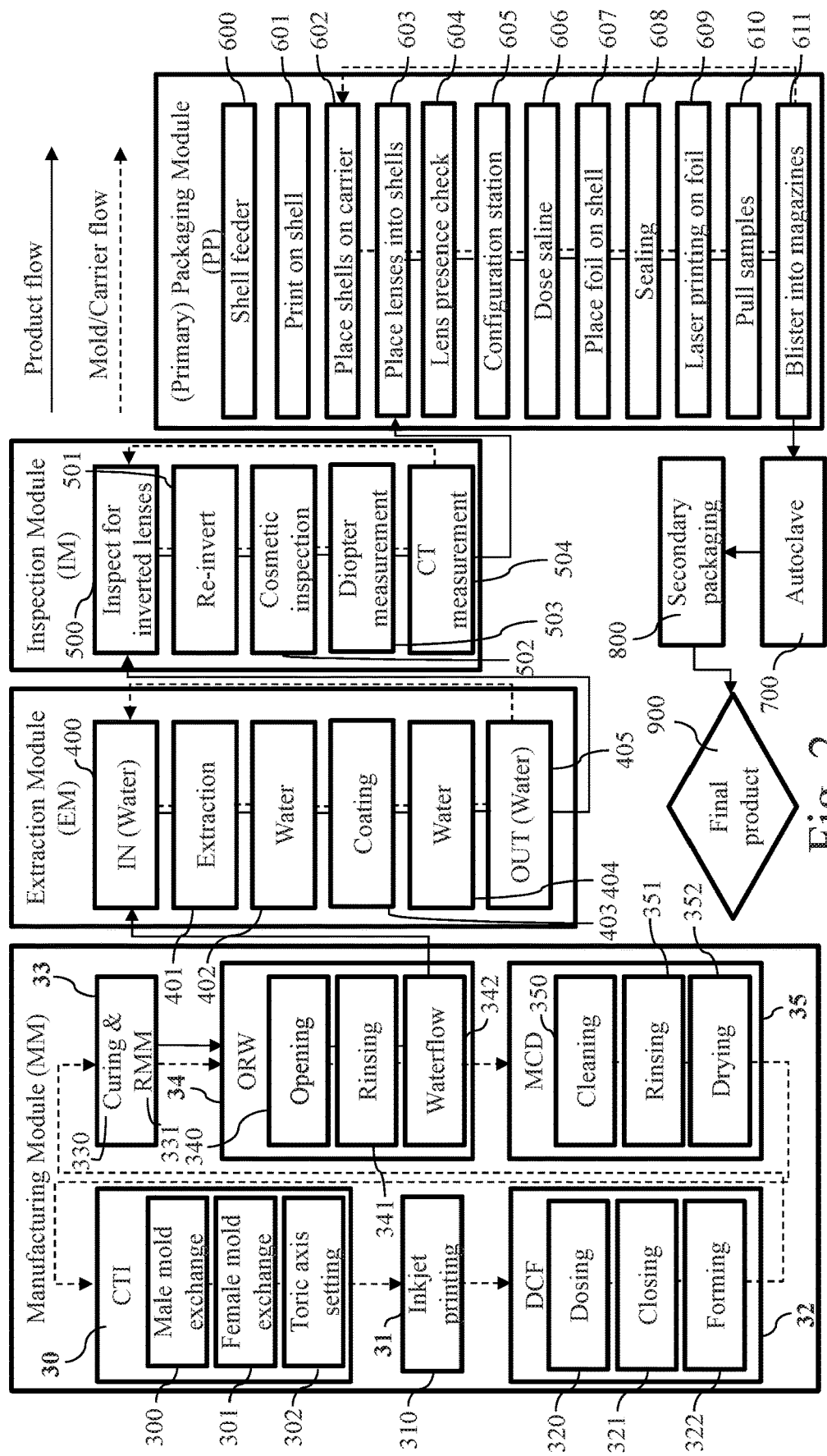
FIG. 2 shows a diagrammatic representation of an embodiment of the modular production line of FIG. 1 showing the individual stations.

In FIG. 2 a diagrammatic representation of an embodiment of the production line PL is shown showing the individual stations of the manufacturing module MM, the extraction module EM, the inspection module IM, and the (primary) packaging module PP.

In the manufacturing module MM, individual manufacturing stations are grouped together to form a plurality of individual manufacturing units, as is discussed below in more detail. A first manufacturing unit 30 labelled "CTI" comprises a male mold exchange station 300, a female mold exchange station 301 and a toric axis setting station 302.

In the male mold exchange station 300, in order to effect a lot change on the fly, for example at mounting site number one (corresponding to the foremost compartment 200 of lens mold carrier 2), it is possible to remove a male mold unit 21 from the foremost compartment 200 of lens mold carrier 2 and to mount a different male mold unit into the said foremost compartment 200 from which the male mold unit 21 has been removed. Alternatively, in the female mold exchange station 301, in order to effect a lot change on the fly, for example at mounting site number one (corresponding to the foremost compartment 100 of lens mold carrier 1), it is possible to remove a female mold unit 11 from the foremost compartment 100 of lens mold carrier 1 and to mount a different female mold unit to the said compartment 100. Of course, it is also possible to remove both the male mold unit 21 and the female mold unit 11 from the respective foremost compartment of the respective lens mold carrier to effect a lot change on the fly at mounting position number one. Further alternatively, in order to effect a lot change on the fly by producing a different toric contact lens, in the toric axis setting station 302 it is possible to rotate adjusting ring 214 (and together with it the male mold 212) by one or more fixed angular increments relative to adapter piece 210, and to then have it lockingly connected with adapter piece 210 again at a different angular position, so that a toric contact lens with a different arrangement of the axes can be produced. The first manufacturing unit labelled "CTI" will be explained in more detail further below.

Lens mold carrier 1 and lens mold carrier 2 are then transferred from manufacturing unit 30 ("CTI") to the next manufacturing station.

The next manufacturing station in the embodiment of the manufacturing module MM of the production line PL is an inkjet printing station 310. In the inkjet printing station, a unique lens identification code, for example a unique code of ink dots or any other suitable type of code is printed onto a mold, e.g. onto the female mold. The code is representative of the characteristics of the contact lens to be produced. This unique lens identification code is applied in each subsequent production cycle to the mold surface.

The ink dots printed on the mold are later transferred to the material forming the contact lens, for example they are embedded into the material forming the contact lens. The information contained in the unique lens identification code may comprise the following information (without being exhaustive): Lens material, base curve radius, optical corrective power, etc. It is also possible that some or all of the coded information is provided on the contact lens through embossing, that is to say, one or both of the molds may have projections (elevations) in a non-optical peripheral portion of the mold or molds which may produce corresponding embossments in the contact lens in a non-optical peripheral portion of the contact lens. Also combinations of embossing and inkjet printing are possible.

It is to be noted that the inkjet printing station 310 is optional only as the code can be provided in a different manner. Also, in general it is not mandatory that a code be provided on the contact lens, as the system control (not shown) of the modular production line PL always knows what type of mold is on each mounting position of each lens mold carrier on the production line PL.

Lens mold carrier 1 and lens mold carrier 2 are then transferred from to a second manufacturing unit 32.

Second manufacturing unit 32 labelled "DCF" comprises a dosing station 320, a closing station 321 and a forming station. In the dosing station 320 a predetermined quantity of lens forming material is dispensed (dosed) into the female molds 112 of the female mold units 11 of lens mold carrier 1. Thereafter, in the closing station 321 assigned pairs of lens mold carriers 1 and 2 are mated, so that upon mating lens mold carrier 1 and lens mold carrier 2, the female molds 112 of lens mold carrier 1 and the respective male molds 212 of lens mold carrier 2 are mated to form mold cavities. All lens mold carriers 1 comprise female male mold units 11 with female molds 112 while the respective assigned lens mold carriers 2 comprise male mold units 21 with male molds 212. In the forming station 322, the respective male molds 212 and female molds 112 are moved into an intermediate closed position, in which the molds are not yet in their final closed position.

In the following, an example is described how lens mold carrier 1 and lens mold carrier 2 may work together in the manufacturing unit 32. As has been described above, the compartments 100 in frame 10 of lens mold carrier 1 and the compartments 200 in frame 20 of corresponding lens mold carrier 2 are very precisely arranged, and adapter piece 110 of female lens mold unit 11 is floatingly arranged in compartment 100 while adapter piece 210 of male lens mold unit 21 is floatingly arranged in compartment 200. Due to the precise arrangement of the compartments 100 and 200 of the frames 10 and 20 the sleeves 111 and 211 are already coarsely aligned as the lens mold carrier 2 is moved towards lens mold carrier 1. During mating, the precise alignment of each pair of associated male mold units 21 and female mold units 11 is then performed automatically: As the rounded portion 2110 of the front end of sleeve 211 comes into contact with the chamfered portion 1110 of the front end of sleeve 111 during mating the lens mold carrier 1 carrying the female mold units 21 and the lens mold carrier 2, either one adapter piece or both adapter pieces of male mold unit 21 and female mold unit 11 move within their respective compartments until the sleeves are precisely aligned whereby the molds are precisely aligned with the aid of the cylindrical outer surface of sleeve 11 that extends over the female mold and the inner surface of sleeve 211 that extends over the male mold 212. This happens with each pair of associated male mold units 21 and female mold units 11 and is possible due to the floating arrangement of the adapter pieces within the respective compartments. All male mold units 11 and female mold units 21 (including the male molds 212 and female molds 112) are then precisely aligned. The lens mold carriers are then further moved towards each other until the molds are closed, with the individual molds being perfectly aligned. Thereafter, the sleeves may be moved a small distance apart again so that the molds are in the intermediate closed position which is not the final closed position.

The mated lens mold carriers 1, 2 are then transferred to a third manufacturing unit 33.

Third manufacturing unit 33 comprises a curing station and a relative mold movement station 330, in which the lens forming material is cured, for example with the aid of UV-light. As is well-known, during UV-light curing the lens forming material is polymerized and/or crosslinked to form the contact lens, however, during curing shrinkage of the lens forming material is known to occur. As both the female molds 112 and the male molds 212 are reusable male molds typically made of glass (e.g. quartz glass or any other suitable glass known in the art) the molds themselves cannot deform to compensate for the shrinkage. Therefore, a relative mold movement is performed such that the male and female molds are moved relative to each other from the afore-mentioned intermediate closed position to the final closed position in accordance with a predetermined movement profile which takes the shrinkage process into account, so that the shape of the contact lens is determined by the shape of the male and female molds in the final closed position. Such relative mold movement of the male and female molds is known in the art and can be performed in different ways, as is described, for example, in WO 2011/045397.

The mated lens mold carriers 1, 2 containing the formed contact lenses are then transferred to a fourth manufacturing unit 34.

Fourth manufacturing unit 34 labelled "ORW" comprises an opening station 340 in which the mated lens mold carriers 1, 2 are separated thus opening the molds, a rinsing station 341 for rinsing away excess lens forming material, and a lens removal station 342 labelled "Waterflow" for removal of the contact lens from the mold and for transferring the contact lens from the manufacturing module MM to the extraction module EM. The lens removal station has been labelled "Waterflow" as removal of the contact lens from the mold and transfer of the contact lens from the manufacturing module MM to the extraction module EM can be performed with the aid of a flow fluid, for example water, as this is known in the art and described, for example, in WO 2008/116856.

Once the contact lenses are transferred from the manufacturing module MM to the extraction module EM, the lens mold carrier 1 with the female mold units 11 comprising the female molds 112 and the lens mold carrier 2 with the male mold units 21 comprising the male molds 212 are transferred to a fifth manufacturing unit 35.

Fifth manufacturing unit 35 labelled "MCD" comprises a mold cleaning station 350 for cleaning of the molds, a rinsing station 351 for a final rinse of the molds, and a subsequent drying station 352 for drying the molds, for example with the aid of air having a well-defined humidity of the drying air. The carrier 1 with the female mold units 11 and the cleaned, rinsed and dried female molds 112 as well as the carrier 2 with the male mold units 21 and the cleaned rinsed and dried molds are then returned to the first manufacturing station labelled "CTI", thus closing the loop and starting the described lens manufacturing process for the next production cycle.

The material flow of the contact lens in the manufacturing module MM is indicated in FIG. 2 by continuous lines whereas the flow of the lens mold carriers or the molds, respectively, in the manufacturing module MM is indicated by dashed lines.

The manufacturing module MM described above in connection with the diagrammatic representation in FIG. 2 is shown in FIG. 3 again in a more structure-related schematic representation showing the arrangement of the individual manufacturing units 30, 32, 33, 34 and 35, as well as the (optional) inkjet printing station 310. As can be seen, transfer robots 36 are arranged between the first manufacturing unit 30 labelled "CTI" and inkjet printing station 310, between inkjet printing station and second manufacturing unit 32 labelled "DCF", between second manufacturing unit 32 labelled "DCF" and third manufacturing unit 33 labelled "RMM/UVL", between the third manufacturing unit 33 labelled "RMM/UVL" and fourth manufacturing unit 34 labelled "ORW", between fourth manufacturing unit 34 labelled "ORW" and fifth manufacturing unit labelled "MCD", and between fifth manufacturing unit 35 labelled "MCD" and first manufacturing unit labelled "CTI". Transfer robots 36 transfer lens mold carriers 1, 2 from one manufacturing unit to the next manufacturing unit. This configuration of the manufacturing module MM is advantageous as it is easily possible to make changes to the manufacturing module MM. For example, additional manufacturing stations or manufacturing units can be added to or manufacturing stations or manufacturing units can be removed from the manufacturing module MM, or the existing manufacturing stations can be rearranged at different locations within the manufacturing module MM. In each such case, it is only necessary to make the robots transfer the lens mold carriers to the location of the respective new location of the next manufacturing unit or manufacturing station. In the case of adding an additional manufacturing station or manufacturing unit to the manufacturing module MM, one or more additional robots are needed.

Turning back to FIG. 2, transfer of the contact lenses from the manufacturing module MM to the extraction module EM is performed in the removal station 342 labelled "Waterflow", as has been described above. The contact lenses are transferred through plastic tubes into containers waiting in a receiving station 400 of the extraction module EM for the contact lenses to arrive. As the lens mold carriers described above comprise fourteen molds each, fourteen contact lenses are produced at the same time. Accordingly, fourteen contact lenses are transferred from the manufacturing module MM to the extraction module EM at the same time. Consequently, fourteen containers are respectively provided in a receiving station for receiving the fourteen contact lenses transferred from the removal station 342 (labelled "Waterflow") of the manufacturing module MM. Containers suitable to transport the contact lenses through the different stations of the extraction module EM are known for example, from WO 2011/045384.

The manufacturing process performed in the manufacturing module MM typically is a cyclic process performed with a predetermined cycle time for all process steps. This holds for the extraction and treatment process performed in the extraction module EM, too. However, as the cycle time of the manufacturing process performed in the manufacturing module MM and the cycle time of the extraction and treatment process performed in the extraction module EM may be different, in order to account for such difference in cycle times an apparatus for transferring the contact lenses between the manufacturing module MM and the extraction module EM can be used as is disclosed in WO 2012/080468.

In the extraction module, the contact lenses are received in the afore-mentioned containers in a receiving station 400 labelled "IN (Water)" and are subsequently transported through different dipping baths. For that purpose, an apparatus as disclosed in WO 2011/045380 can be used, for example. The contact lenses contained in the containers are first transported from the receiving station 400 (labelled "IN (Water)") to an extraction station 401 (which may comprise one or more extraction baths) where unwanted substances, for example non-polymerized and/or non-crosslinked lens forming material or solvents, are extracted from the contact lenses. Thereafter, the contact lenses contained in the containers are again transported to a neutralization station 402 (labelled "Water") which may comprise one or more water baths. Subsequently, the contact lenses contained in the containers are transported to a coating station 403 (which may comprise one or more coating baths) for applying a coating to the contact lenses. Thereafter, the contact lenses contained in the containers are again transported to a neutralization station 404 (labelled "Water" again) before they are transported to a transfer station 405 (labelled "OUT (Water)") from where the contact lenses contained in the container are transferred from the extraction module EM to an inspection module IM for inspection as this is represented by the continuous line in FIG. 3 starting at the base of transfer station 405 and ending at the first inspection station of the inspection module IM. The containers of the extraction module EM are then returned to the receiving station 400 (labelled "IN (Water)") as is indicated by the dashed lines in FIG. 3.

Removal of the contact lenses from the containers at the transfer station 405 of extraction module EM and transfer of the contact lenses into inspection cuvettes waiting in the inspection module IM can be performed using a suitable gripper. Inspection cuvettes suitable for being used in the inspection module IM are known, for example, from WO 03/016855, while a gripper suitable for the transfer of the contact lenses from the containers of extraction module EM into the inspection cuvettes waiting in inspection module IM is disclosed in WO 2012/066060, for example.

In the inspection module IM, the contact lenses contained in the inspection cuvettes are first inspected in a first inspection station 500 of the inspection module IM as to whether or not the contact lenses are inverted. By way of example, such type of inspection can be performed in the manner described in WO 2015/036432. In case the result of this inspection is that a contact lens is inverted, the contact lens can be reinverted in a second inspection station 501 of the inspection module in order to thereafter have the contact lens arranged in the inspection cuvette in the correct inversion state (i.e. the contact lens is non-inverted). Re-inversion of the contact lens can be performed in the manner described in WO 2009/103732, for example. Once in the proper inversion state, the contact lens is inspected for cosmetic defects such as bubbles, inclusions, edge defects (e.g. tears), etc., in a third inspection station 502 of the inspection module IM. This cosmetic inspection can be performed in the manner described in WO 2007/060173, for example. In a subsequent fourth inspection station 503 (labelled "Diopter measurement"), the contact lens is inspected to determine its optical parameters such as the optical power. This can be performed in the manner described in WO 2014/049053, for example. Finally, in a fifth inspection station 504 (labelled "CT measurement") the contact lens is inspected to determine the central thickness of the contact lens, and this can be performed, for example, in the manner described in WO 2014/049050. The sequence of the inspection stations in inspection module IM is not limited to the sequence shown in FIG. 2, at least the three last inspection stations can be arranged in a different sequence (however, inspection of the contact lens should occur with the contact lens being in the proper inversion state).

In case a contact lens has failed to pass one or more of the inspections performed in the third inspection station 502 ("Cosmetic inspection"), the fourth inspection station 503 ("Diopter measurement") or the fifth inspection station 504 ("CT measurement"), such contact lens is sorted out and discarded. Contact lenses that have passed all of the aforementioned inspection steps are transferred into a primary package waiting in a lens placement station of a (primary) packaging module PP, as this is indicated by the continuous line. A primary package suitable for this purpose and comprising a packaging shell and a foil sealed to the top surface of the packaging shell is described, for example, in U.S. Pat. No. 5,609,246.The inspection cuvettes are cleaned and returned to the first inspection station 500 where contact lenses coming from the extraction module EM are transferred into the inspection cuvettes in the inspection module IM again, as this is indicated by the dashed lines.

In the (primary) packaging module PP, in a first packaging station 600 (labelled "Shell feeder") packaging shells are supplied. In a second, optional packaging station 601 (labelled "Print on shell") various information may be printed on the shell (such as, for example, date of production, contact lens data, etc.). Next, in a third packaging station 602 the packaging shells are placed on a carrier on which the packaging shells are further transported through the packaging module PP. For example, five packaging shells are arranged on the same carrier. In a subsequent fourth packaging station 603, the contact lenses that have successfully passed all inspections in the inspection module IM are placed into the packaging shells arranged on the carrier, until each of the packaging shells contains a contact lens (in each of the individual packaging shells on the same carrier the same type of contact lens is contained). The transfer of a contact lens out of the inspection cuvettes used in the inspection module and into a packaging shell arranged on the carrier can be performed, with the aid of a gripper. A gripper suitable for this transfer is described in WO 2011/026868, for example.

In the fifth packaging station 604 (labelled "lens presence check") it is determined whether in each of the packaging shells a contact lens is contained in order to prevent a packaging shell from being sealed with a foil with no contact lens being contained in the packaging shell for any reason (for example, a contact lens has not been properly placed in the packaging shell, or a gripper has indicated that a contact lens has adhered to the gripper and has been placed into the shell although actually no contact lens has adhered to the gripper). The lens presence check can be performed, for example, with the aid of a camera suitable to read the ink code of the contact lens which does not only indicate the presence of the contact lens in the packaging shell but can also be used to check (by identification of the ink code) whether the correct contact lens is contained in the packaging shell.

The carrier is then moved to a sixth packaging station 605 (labelled "Configuration station") which is an optional station. The configuration station is a kind of an intermediate buffer in which contact lenses can be temporarily stored in packaging shells (without a foil being sealed thereto), however, only for a predetermined time so as to prevent the contact lenses in the packaging shells from drying. If it has been detected in the fifth packaging station 604 ("lens presence check") that there is one or more shells arranged on the carrier in which no contact lens is contained, a check is performed whether one or more shells containing a contact lens of the same type are present in the configuration station. In case such packaging shell is present in the configuration station, the shell on the carrier that does not contain a contact lens is removed from the carrier and is the corresponding shell containing the same type of contact lens is taken from the configuration station and is placed on the carrier instead.

As the configuration station is optional only, in case there is no configuration station and it is detected during the lens presence check performed in the fifth packaging station 604 that a contact lens is missing in one or more of the packaging shells on a carrier, then the whole arrangement of shells on that carrier is discarded (since the shells arranged on the same carrier are typically sealed together to form a strip as will be described below, and this would mean that in one or more of the shells of a strip no contact lens is contained, which is not acceptable).

In a seventh packaging station 606 (labelled "Dose saline") a predetermined amount of packaging liquid is dispensed (dosed) into each of the packaging shells.

It is of course also possible to arrange the fifth packaging station 604 ("lens presence check") downstream of the seventh packaging station 606 ("Dose saline"), in particular as it may turn out that the lens identification code is difficult to read as the contact lens may not be completely unfolded without a sufficient amount of saline being present in the packaging shell.

In a subsequent eighth packaging station 607 (labelled "Place foil on shell") a foil, for example a laminated aluminum foil comprising a thermoplastic layer, is placed on the shell. Alternatively, as is well-known, a foil strip extending over a plurality of packaging shells adjacently arranged on a carrier is sealed to each of the adjacently arranged packaging shells to form a strip of contact lens packages in which the individual packages of the strip are connected to one another by the foil strip. The foil strip connecting the individual packages to the strip of contact lens packages can be scored or perforated at the connection between adjacent packages of the strip so as to allow for separation of an individual contact lens package from the strip.

Thereafter, in a ninth packaging station 608 (labelled "Sealing") the foil or the foil strip, respectively, is sealed to the packaging shell (or to the packages, respectively) at the top surface of the packaging shell. In a subsequent tenth packaging station 609 (labelled "Laser printing on foil") information (e.g. base curve radius, optical power, etc.) related to the contact lens contained in the package is printed on the foil, for example by using laser printing.

Dosing packaging liquid into the shell, lens presence check, placing and sealing of a foil to the shell, and laser printing are all conventional techniques and, therefore, they are not discussed in detail.

In an (optional) eleventh packaging step 610 (labelled "Pull samples") some sealed packages or strips of the sealed packages may be taken from the production line from time to time and may be inspected offline to make sure that the production line works well and to ensure quality of the packaged contact lenses. Finally, in a twelfth packaging step 611 (labelled "Blister into magazines") the sealed and printed contact lens packages or strips of contact lens packages are removed from the carriers and are placed into magazines for autoclaving. The carriers are then returned for the next packaging shells being placed on them.

Autoclaving of the contact lens packages or strips of contact lens packages is then performed in an autoclave 700, and once autoclaving is performed the autoclaved contact lens packages are further placed in a secondary packaging line 800 (labelled "Secondary packaging") into secondary packages, for example cartons, which form the final product 900 for subsequent shipping.

As has been mentioned above already, with the modular production line PL according to the invention, and in particular with the manufacturing module MM according to the invention, it is possible to perform a lot change on the fly, that is to say it is possible to exchange (replace) at least one of the molds on the lens mold carriers without the need to interrupt production and without the need to clear the production line by removing all lens mold carriers from the production line and place new lens mold carriers on the production line.

Figure 3:
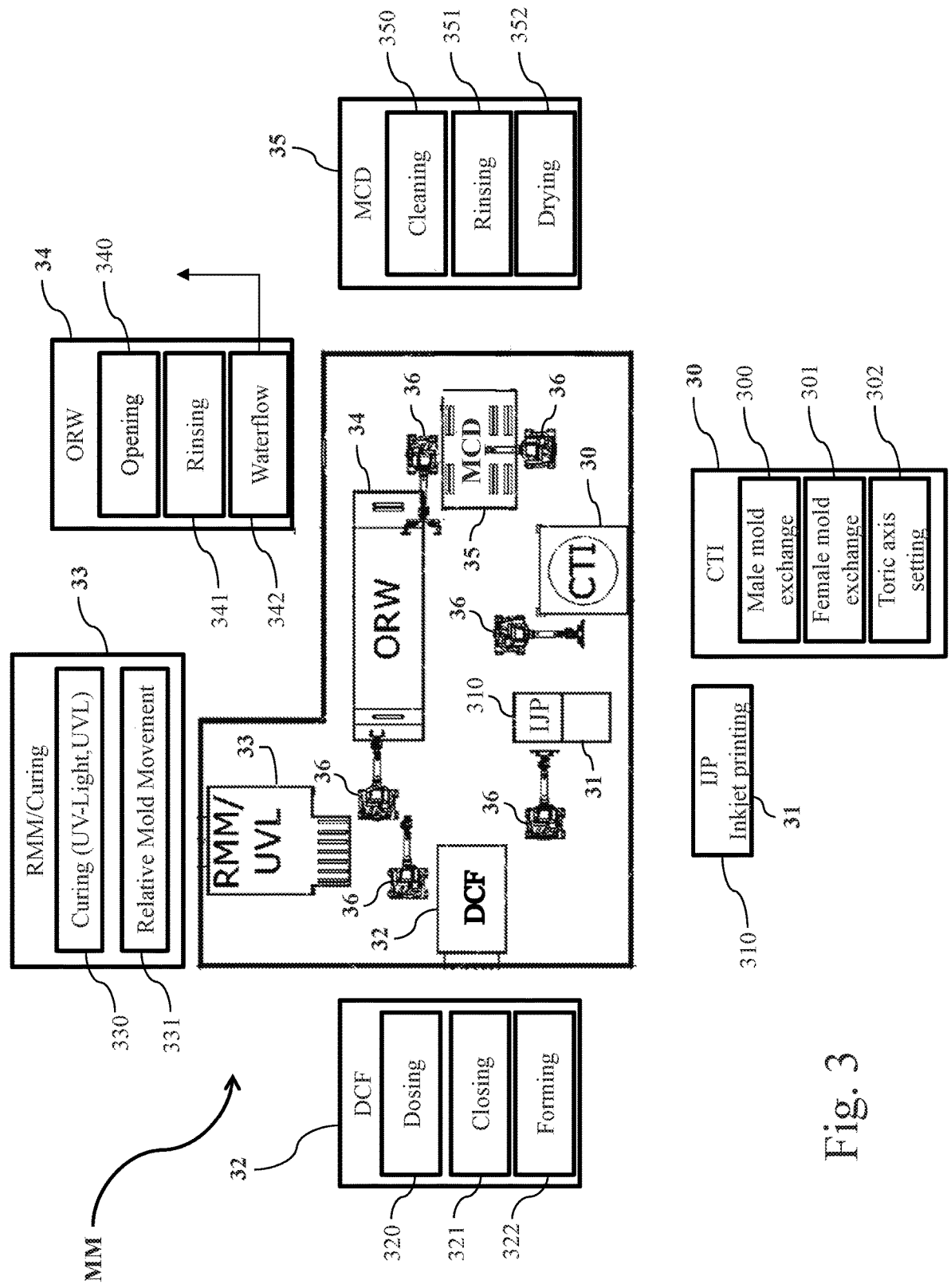
FIG. 3 shows an embodiment of the manufacturing module of the modular production line.
Figure 11:
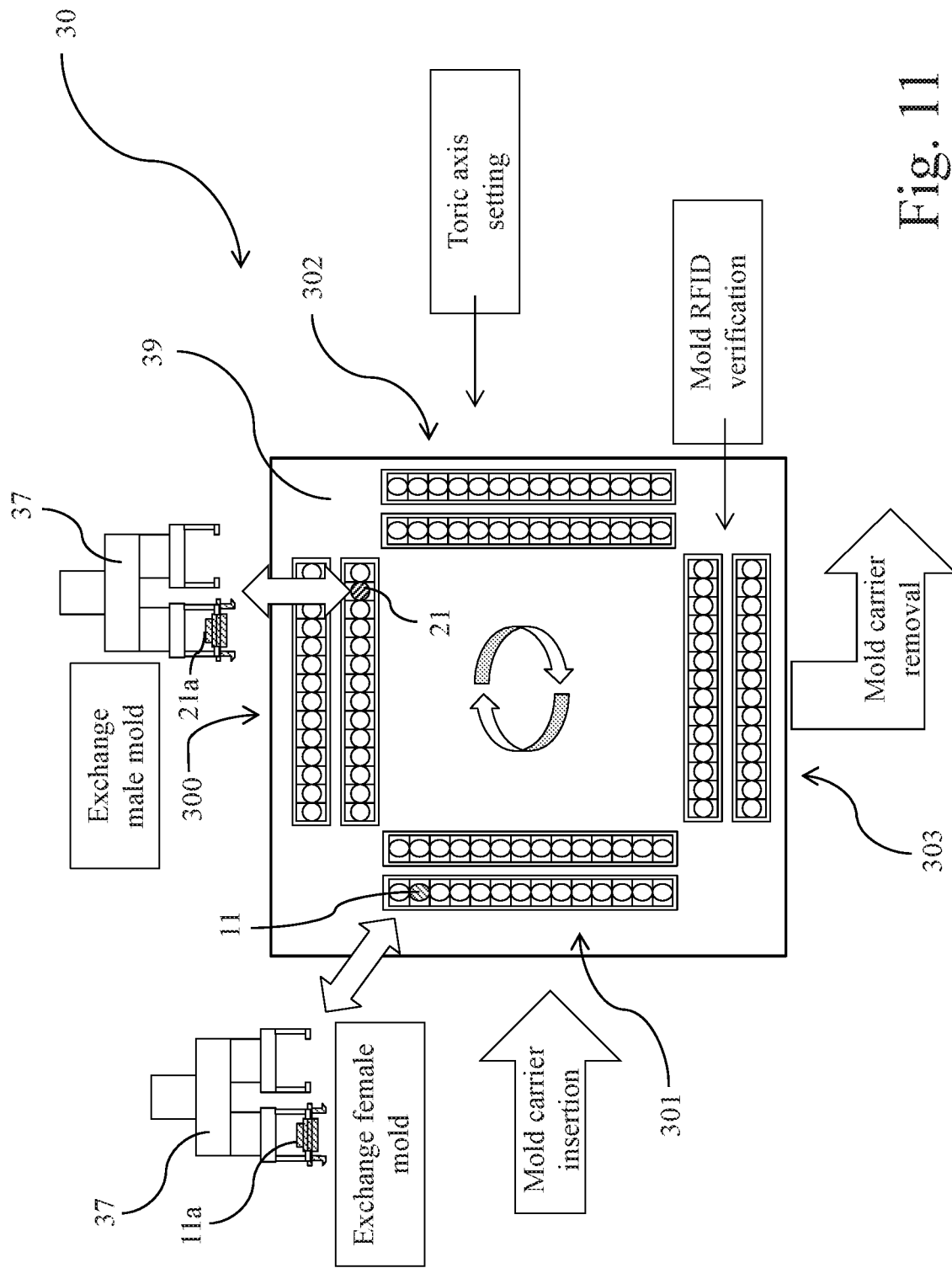
FIG. 11 shows an embodiment of the mold changing station of the manufacturing module.

In the manufacturing module MM, the lot change on the fly can be performed by the first manufacturing unit 30 (labelled "CTI") in FIG. 2 and FIG. 3. One example of such manufacturing unit 30 is shown in more detail in FIG. 11. Insertion and removal of the lens mold carriers 1, 2 into and from the manufacturing unit 30 are indicated by respective arrows. Manufacturing unit 30 comprises a rotary table 39 which can be rotated clockwise, for example, as is indicated in FIG. 11 by the curved arrows in the center of table 39. At station 301, female molds can be exchanged by removing female mold units 11 from their compartment 100 of lens mold carrier 1 and by mounting a different female mold unit 11a to the said compartment 100 of lens mold carrier 1 from which female mold unit 11 has been removed. For example, in FIG. 11 it is shown that female mold unit 11 arranged at position number two (hatched in FIG. 11) of lens mold carrier 1 is exchanged and replaced with a different mold unit 11a with the aid of a respective exchange tool 37, as will be described in more detail below with respect to FIG. 12. Once the exchange of female mold unit 11 is completed, rotary table 39 is rotated clockwise by ninety degrees so that at station 300 a male mold exchange can be performed. Exchange of a male mold unit 21 (and replacement with a different male mold unit 21a) can be performed similar to an exchange of a female mold unit in the same manner using a similar mold exchange tool 37. By way of example, exchange of male mold unit 21 may be performed at position number two of lens mold carrier 2. The male and female mold exchanges (by exchanging the mold units) are indicated by double-headed arrows in FIG. 11. Once the exchange of the male mold unit 21 is completed, rotary table 39 is again rotated clockwise by ninety degrees, so that at station 302 a toric axis setting/change can be performed. This can be performed, for example, with a suitable rotation tool (not shown) which may engage the flat surfaces of sleeve 211 at the back end of male mold unit 21 (see FIG. 10) and rotate sleeve 211 either clockwise or counterclockwise by one or more teeth of the toothed adjusting ring 214, as this is already described further above. Once the toric axis setting/change is completed, table 39 is rotated again clockwise by ninety degrees so that in a further station 303 the individual RFIDS of the molds can be read and stored so that it is known what type of mold is arranged at what compartment 100, 200 of the lens mold carriers 1, 2. Lens mold carriers 1, 2 are then removed with the aid of a robot 36 and are transported to the next station, for example the inkjet printing station 310 as described above with respect to FIG. 2 and FIG. 3. It goes without saying, that either a male mold exchange, or a female mold exchange, or a toric axis change/setting can be performed in order to perform a lot change on the fly, or combinations thereof. If no lot change on the fly is to be performed, none of these exchanges/changes/settings is performed.

Figure 12:
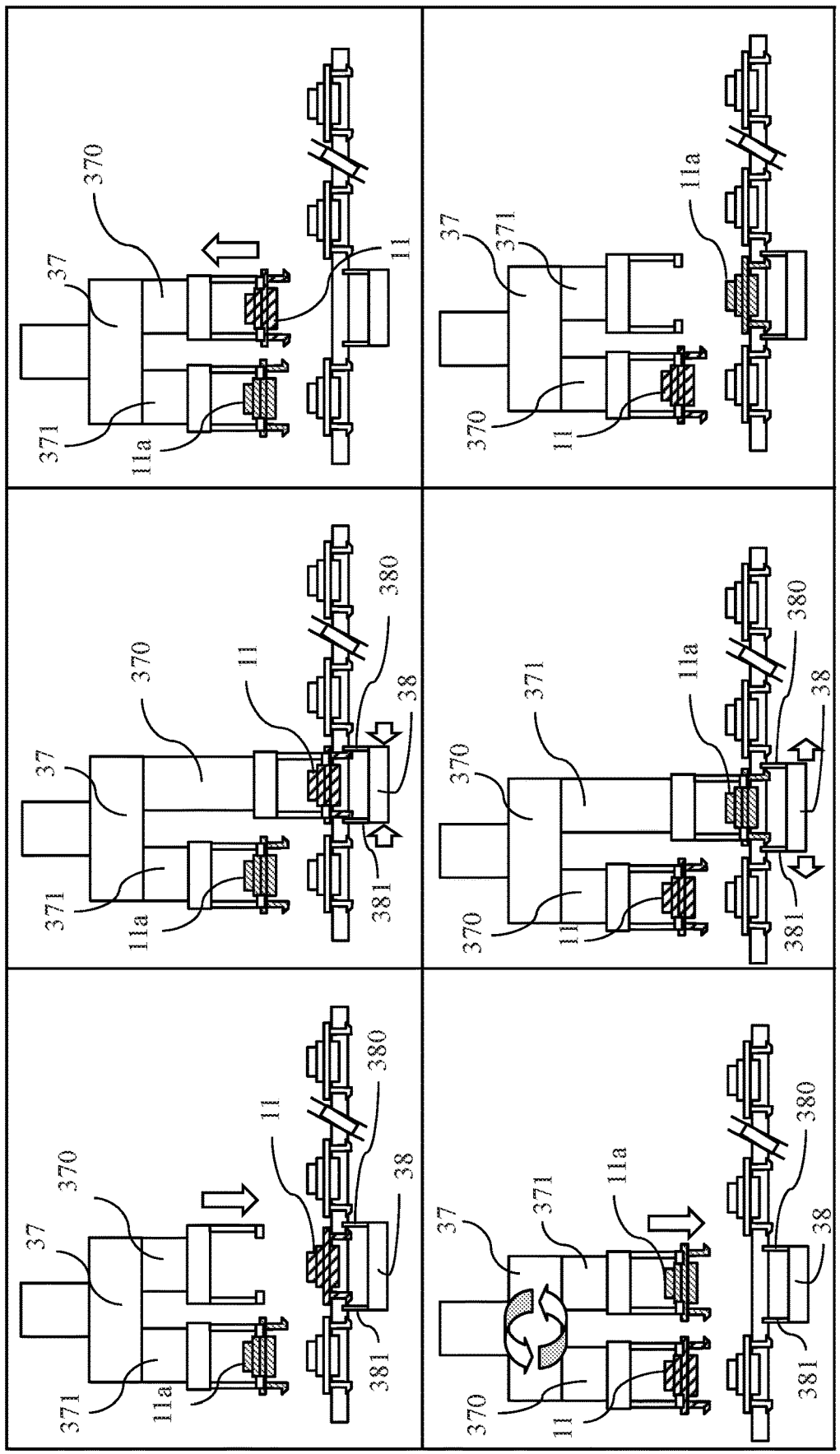
FIG. 12 shows the various states and actions performed during a mold exchange.

FIG. 12 shows the individual states during a female mold exchange performed with the aid of an exchange tool 37. In the upper left box of FIG. 12, exchange tool 37 is shown in its initial position. In this initial position, exchange tool 37 is arranged above female mold unit 11 arranged in the compartment 100 at position number two of lens mold carrier 1. Exchange tool 37 comprises two gripper arms 370, 371. Gripper arm 370 is empty and ready for gripping female mold unit 11 to be removed from compartment 100 of lens mold carrier 1 while gripper arm 371 holds a new female mold unit 11a to be inserted into the said compartment 100 of lens mold carrier 1 after female mold unit 11 has been removed. As can be seen further in FIG. 12, there is a snap fit release tool 38 having two arms 380, 381 that can be moved towards and away from each other. As is indicated by the arrow in the upper left box of FIG. 12, exchange tool 37 is then lowered from the initial position towards female mold unit 11 to be exchanged.

In the upper central box of FIG. 12, it is shown that gripper arm 370 of exchange tool 37 has been lowered until it engages female mold unit 11. Arms 380, 381 of snap fit release tool 38 are moved towards each other (see arrows) to flex resilient latches 113 (see FIG. 5) of female mold unit 11 inwardly. As can be seen in the upper right box of FIG. 12, gripper arm 370 of exchange tool 37 is then raised again (see arrow) with female mold unit being gripped by gripper arm 370, thus removing female mold unit 11 from compartment 100 of lens mold carrier 1. As can be seen in the lower left box of FIG. 12, exchange tool 37 is then rotated clockwise or counterclockwise by 180° thus arranging gripper arm 371 holding new female mold unit 11a to be inserted above the compartment 100 of lens mold carrier 1 from which female mold unit 11 has been removed. Gripper arm 371 of exchange tool 37 is then lowered (see arrow in lower left box of FIG. 12) until new female mold unit 11a is placed into compartment 100 of lens mold carrier 1. At that time, arms 380, 381 of snap fit release tool 38 are still in the position in which they have been moved towards each other to allow for easy insertion of the resilient latches of new female mold unit 11a into compartment 100 of lens mold carrier 1. Once new female mold unit 11a has been inserted into compartment 100 of lens mold carrier 1 as shown in the central lower box of FIG. 12, pliers arms 380, 381 of snap fit release tool 38 are moved away from each other again (see arrows in central lower box of FIG. 12). New female mold unit 11a is now mounted to the frame of lens mold carrier 1 at compartment 100, and the exchange process.

In case the production process is to be changed by adding one or more additional chemical treatment stations to the extraction and treatment module EM, such additional chemical treatment stations can be arranged in the legs of the U-shaped extraction and treatment module EM which would, however, not change the location of the transfer interfaces MM-EM and EM-IM but would increase the lengths of the legs of the "U" of the U-shaped extraction and treatment module EM. However, the expense for integrating these additional stations in the extraction and treatment module EM is comparatively low.

Similarly, in the production process is to be changed by adding one or more additional manufacturing stations or units to the manufacturing module MM, such additional manufacturing stations or units can be arranged in the manufacturing module MM, however, in this case one or more additional transfer robots 36 will be needed in order to integrate the newly added manufacturing stations or units in the manufacturing module MM.

The afore-described embodiment of the manufacturing module comprises a plurality of individual manufacturing units in which the process steps to make a contact lens using specific lens forming materials and molds are performed. As described in detail, the male and female molds used to make the contact lenses are transferred on lens mold carriers between individual manufacturing units by transfer robots. By this combination of transfer robots and manufacturing units a closed loop for the molds in the manufacturing module for a continuous production of contact lenses is generated. On the other side, this open architecture of the manufacturing module gives free access to all manufacturing units and manufacturing stations in case the production process has to be changed or maintenance or repair is needed. In order to have free access to the individual manufacturing units and manufacturing stations all or individual transfer robots just have to be brought to their specific home positions. For example, if contact lenses are to be produced from a new lens forming material having a longer UV-crosslinking time, the manufacturing unit 33 can be modified by adding additional UV-crosslinking stations. With the aid of these additional UV-crosslinking stations the total residence time of each lens mold carrier in the respective UV-crosslinking station can be increased while keeping the output constant, since the cycle time of the manufacturing module can be kept constant when compared to a lens forming material having a shorter crosslinking time. Only the transfer robot must know at which of the individual UV-crosslinking stations the new lens forming material has been exposed to UV-light for the longer UV-crosslinking time required to form the contact lenses from the new lens forming material. In combination with the control system, such changes can be realized at the respective manufacturing unit (in this example at manufacturing unit 33) and have no impact on the rest of the manufacturing units.

Embodiments of the production line according to the invention have been described above with the aid of the drawings. However, it is evident that many modifications and changes are possible without departing from the teaching underlying the invention. Therefore, the invention is not limited to the embodiments shown and described, but rather the scope of protection is defined by the appended claims.

The invention claimed is:

1. Modular production line for production of contact lenses, comprising at least three separate modules, the at least three separate modules comprising
   a manufacturing module (MM) in which the contact lenses are manufactured,
   an inspection module (IM) in which the contact lenses are inspected, and
   a packaging module (PP) in which the contact lenses which have been identified by the inspection module (IM) as being acceptable are packed into primary packages,
   the modular production line further comprising fixedly arranged transfer interfaces between individual modules (MM, IM, PP) for transferring the contact lenses from a respective preceding module of the at least three separate modules to a respective subsequent module of the at least three separate modules,
   wherein the manufacturing module (MM) comprises a plurality of manufacturing stations comprising a male mold exchange station (300), a female mold exchange station (301), a toric axis setting station (302), an inkjet printing station (310), a dosing station (320), a closing station (321), a forming station (322), a curing station (330), a relative mold movement station (331), a mold opening station (340), a rinsing station (341), a removal station (342), a mold cleaning station (350), a mold rinsing station (351), and a mold drying station (352), wherein the plurality of manufacturing stations of the manufacturing module (MM) are grouped to form a plurality of individual manufacturing units comprising a first individual manufacturing unit (30); inkjet printing unit (31); a second individual manufacturing unit (32); a third individual manufacturing unit (33); a fourth individual manufacturing unit (34); a fifth individual manufacturing unit (35) arranged in a closed loop, and wherein the manufacturing module (MM) further comprises reusable male and female molds (212, 112) which are transported through the plurality of manufacturing stations of the individual manufacturing units arranged in the closed loop, and wherein the manufacturing module (MM) further comprises a plurality of transfer robots (36), each transfer robot (36) of the plurality of transfer robots (36) being arranged at a location between two individual manufacturing units of the plurality of individual manufacturing units and being configured to transfer the reusable male and female molds from one of the two individual manufacturing units between which the respective transfer robot (36) is arranged to the other one of the two individual manufacturing units between which the respective transfer robot (36) is arranged.

2. Modular production line according to claim 1, further comprising
   an extraction and treatment module (EM) for the extraction and chemical treatment of the contact lenses manufactured in the manufacturing module (MM),
   wherein the extraction and treatment module (EM) comprises a plurality of chemical treatment stations which are arranged in a U-shaped configuration from a transfer interface (MM-EM), where the contact lenses are transferred from the manufacturing module (MM) to the extraction and treatment module (EM), to a transfer interface (EM-IM) where the contact lenses are transferred from the extraction and treatment module (EM) to the inspection module (IM).

3. Modular production line according to claim 2, wherein the chemical treatment stations of the extraction and treatment module (EM) comprise at least one extraction station (401) extracting unwanted substances from the contact lenses, and at least one additional chemical treatment station for chemical treatment of the extracted contact lenses, with the at least one additional chemical treatment station being arranged downstream of the at least one extraction station (401) with respect to a path of transportation of the contact lenses through the chemical treatment stations arranged in the U-shaped configuration in the extraction and treatment module (EM).

4. Modular production line according to claim 2, wherein the plurality of chemical treatment stations or at least one additional chemical treatment station, respectively, comprises at least one coating station (403) for coating the contact lenses.

5. Modular production line according to claim 2, wherein the extraction and treatment module (EM) further comprises one or more water treatment stations (400, 402, 404, 405), with one or more water treatment stations being arranged at least between different types of the said plurality of chemical treatment stations or between different types of additional chemical treatment stations, respectively.

6. Modular production line according to claim 5, wherein the extraction and treatment module (EM) comprises at least one extraction station (401), at least one coating station (403), and a plurality of the water treatment stations (400, 402, 404, 405), wherein a first water treatment station (400) of the said plurality of water treatment stations (400, 402, 404, 405) is arranged at the interface between the manufacturing module (MM) and the extraction and treatment module (EM), wherein the at least one extraction station (401) is arranged downstream of the first water treatment station (400), wherein a second water treatment station (402) of the plurality of water treatment stations (400, 402, 404, 405) is arranged downstream of the at least one extraction station (401), wherein the at least one coating station (403) is arranged downstream of the second water treatment station, and wherein a third water treatment station (404) of the plurality of water treatment stations (400, 402, 404, 405) is arranged downstream of the at least one coating station (403).

7. Modular production line according to claim 1, wherein in the manufacturing module (MM)
the first individual manufacturing unit (30) of the plurality of manufacturing units comprises the male mold exchange station (300), the female mold exchange station (301), and the toric axis setting station (302),
the second individual manufacturing unit (32) of the plurality of manufacturing units comprises the dosing station (320) dosing a contact lens forming material into male or female molds, the closing station (321) mating the male and female molds, and the forming station (322) moving the mated male and female molds to an intermediate closed position,
the third individual manufacturing unit (33) comprises the curing station (330) curing the contact lens forming material to form contact lenses, and the relative mold movement station (331) performing a relative movement of the male and female molds from the intermediate closed position to a final closed position during curing of the contact lens forming material,
the fourth individual manufacturing unit (34) comprises the mold opening station (340) separating the male and female molds, the rinsing station (341) rinsing away any excess contact lens forming material from the male and female molds, and the removal station (342) removing the contact lenses from the male and female molds and transferring them out of the manufacturing module (MM), and
the fifth individual manufacturing unit (35) comprises the mold cleaning station (350), the mold rinsing station (351), and the mold drying station (352).

8. Modular production line according to claim 1, wherein the manufacturing module (MM) is configured to assign to each contact lens a unique contact lens identification code which is representative of a type of contact lens at least for a predetermined period of time.

9. Modular production line according claim 8, wherein the inkjet printing station is configured to print the unique contact lens identification code to one of the reusable male and female molds.

10. Modular production line according to claim 1, wherein the inspection module (IM) comprises an inversion detection station (500) inspecting the contact lenses as to whether the contact lenses are inverted, a reinversion station (501) reinverting the contact in case they have been detected as being inverted, a diopter measurement station (503) measuring the optical properties of the contact lenses, and a center thickness measurement station (504) measuring the center thickness of the contact lenses.

11. Modular production line according to claim 1, wherein the packaging module (PP) comprises a shell providing station (602) providing a packaging shell, a contact lens placement station (603) placing a contact lens into the packaging shell, a liquid dosing station (606) dosing a packaging liquid into the packaging shell, a foil placement station (607) placing a foil onto the packaging shell, a sealing station (608) sealing the foil to the packaging shell, and a printing station (609) printing on the foil information about the contact lens contained in the sealed packaging shell.

12. Modular production line according to claim 11, wherein the packaging module (PP) further comprises a contact lens detection station (604) arranged downstream of the contact lens placement station (603), as well as a configuration station (605) intermediately storing a plurality of contact lenses and placing a contact lens intermediately stored in the configuration station into said shell in case it has been detected in the contact lens detection station (604) that no contact lens has been placed into the shell in the contact lens placement station (603).

* * * * *